United States Patent [19]
Hafner et al.

[11] Patent Number: 5,861,443
[45] Date of Patent: Jan. 19, 1999

[54] POLYMERIZABLE COMPOSITION AND PROCESS FOR POLYMERIZING CYCLICAL OLEFINS

[75] Inventors: Andreas Hafner, Laupen; Paul Adriaan Van Der Schaaf, Fribourg; Andreas Mühlebach, Belfaux, all of Switzerland

[73] Assignee: Ciba Specialty Chemicals Corporation, Tarrytown, N.Y.

[21] Appl. No.: 836,422

[22] PCT Filed: Nov. 6, 1995

[86] PCT No.: PCT/EP95/04362

§ 371 Date: May 14, 1997

§ 102(e) Date: May 14, 1997

[87] PCT Pub. No.: WO96/16103

PCT Pub. Date: May 30, 1996

[30] Foreign Application Priority Data

Nov. 17, 1994 [CH] Switzerland .............................. 3464/94

[51] Int. Cl.$^6$ .............................. C08F 2/48; C08F 32/00; C08F 34/00
[52] U.S. Cl. .............................. 522/64; 522/66; 522/28; 522/29; 522/167; 522/168; 522/179; 522/184; 522/186; 522/188
[58] Field of Search .............................. 522/66, 184, 168, 522/188, 29, 18, 28, 64

[56] References Cited

U.S. PATENT DOCUMENTS

| | | | |
|---|---|---|---|
| 3,856,758 | 12/1974 | Ueshima et al. | 260/78.4 N |
| 4,642,329 | 2/1987 | Kirchhoff et al. | 526/284 |
| 5,089,536 | 2/1992 | Palazzotto | 522/28 |
| 5,198,511 | 3/1993 | Brown-Wensley et al. | 526/113 |
| 5,776,997 | 7/1998 | Hafner et al. | 522/28 |

Primary Examiner—Susan W. Berman
Attorney, Agent, or Firm—Luther A. R. Hall

[57] ABSTRACT

Process for the photocatalytic polymerization of a cyclical olefin or at least two different cyclical olefins in the presence of a metal compound as the catalyst, which is characterized in that a photochemical ring-opening metathesis polymerization is carried out in the presence of a catalytic amount of at least one carbene-free, bivalent-cationic ruthenium or osmium compound which contains at least one phosphine group, at least one photolabile ligand, and optionally neutral ligands bonded to the metal atom, a total of 2 or 3 ligands being bonded, and which contains acid ions for balancing the charge. The process can also be carried out by first carrying out the irradiation and ending the polymerization by heating. The process is suitable, for example, for the preparation of thermoplastics shaping compounds and the production of coatings and images in relief.

35 Claims, No Drawings

POLYMERIZABLE COMPOSITION AND PROCESS FOR POLYMERIZING CYCLICAL OLEFINS

The present invention relates to a process for polymerizing cyclical olefins by photochemical ring-opening metathesis polymerization using catalytic amounts of a ruthenium(II) or osmium(II) catalyst which contains at least one phosphine group and one photolabile ligand bonded to the metal atom, and compositions comprising these olefins together with a catalytic amount of this catalyst.

Thermally induced ring-opening metathesis polymerization using catalytic amounts of metal catalysts has already been known for a relatively time and is described in many cases in the literature [cf., for example, Ivin, K. J., Olefin Metathesis 1–12, Academic Press, London (1983)]. Such polymers are prepared industrially and are commercially obtainable, for example as Vestenamer®. On the other hand, only little has become known on photochemically induced ring-opening metathesis polymerization and as yet there have been no commercial applications.

It is known from U.S. Pat. No. 4,060,468 to carry out an olefin metathesis polymerization by introducing a two-component mixture of a metal salt chosen from salts of tungsten, molybdenum, rhenium and tantalum and a substituted phenol or benzyl alcohol as cocatalysts into a reaction vessel with the monomeric olefin and then irradiating the entire reaction mixture with UV light. Only cyclical and acyclical hydrocarbons without functional groups or substituents are mentioned as olefins. Separate storage of the catalyst components and the process step of mixing the catalyst components directly before the actual reaction make the known process industrially expensive and cumbersome.

Tanielan et al. [Tanielan, C., Kieffer, R., Harfouch, A., Tetrahedron Letters 52:4589–4592 (1977)] describe the catalyst system $W(CO)_6/CCl_4$, which, after irradiation with UV light, can be employed for metathesis polymerization of cyclopentene and norbornene. Metal carbonyls are volatile and toxic, so that their use necessitates expensive safety precautions for physiological reasons. Furthermore, a free-radical addition reaction with formation of monomeric 1-chloro-2-trichloromethyl-cycloalkanes is observed as a competing reaction.

It is known from Thoi et al. [Thoi, H. H., Ivin, K. J., Rooney, J. J., J. Mol. Catal. 15:245–270 (1982)] that a tungsten pentacarbonyl-carbene complex of the formula

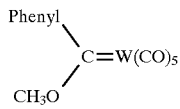

is a thermal catalyst for ring-opening metathesis polymerization of dimethyinorbornene, and together with phenylacetylene as a cocatalyst, is also a photocatalyst system for the same polymerization. This catalyst system has the serious disadvantage that, as a ready-to-use formulation, it has only a low storage stability, the carbonyl compound is physiologically unacceptable and the tolerance toward functional groups in cycloolefins is too low.

Feldman and Schrock [Feldman, J., Schrock, R. R., in: Lippard, S. J. (editor), Progress in Inorganic Chemistry 39:1–74 (1991)] describe molybdenum- and tungsten-alkylidene complexes which by themselves are only weak but together with Lewis acids are active thermal catalysts for the polymerization of cycloolefins.

The known catalysts which can be activated photochemically thus always require a cocatalyst, which means that the quality of the polymers prepared can vary greatly as a result of the chosen nature and sequence of the reagents.

Polymers of cyclical olefins can be prepared by photochemical ring-opening metathesis polymerization by the known processes only with a high expenditure and in an economically unsatisfactory manner. The lack of storage stability, which allows mixing of the components only directly before the preparation, the lack of tolerance toward functionalized cyclical olefins and the need to use two components as the catalyst system are found to be particular disadvantages. There is therefore a need to provide a generally usable process, which is improved from industrial, economic and ecological aspects, for the preparation of polymers from cyclical olefins by photochemical ring-opening metathesis polymerization.

WO 93/13171 describes air- and water-stable one-component and two-component catalysts based on molybdenum compounds and tungsten compounds containing carbonyl groups and ruthenium compounds and osmium compounds with at least one polyene ligand for the thermal metathesis polymerization and a photoactivated metathesis polymerization of tight cycloolefins, in particular norbornene and norbornene derivatives. No other polycyclical—above all nonfused polycyclical—cycloolefins are mentioned. The one-component catalysts of the ruthenium compounds used, that is to say $[(C_6H_6)Ru(CH_3CN)_2Cl]^+PF_6^-$ and $[Ru(cumene)Cl_2]_2$, can indeed be activated by UV irradiation; however, the storage stability of the compositions with norbornene are [sic] completely inadequate. These catalysts are capable of replacing the known two-component catalysts only inadequately.

Demonceau et al. [Demonceau, A., Noels, A. F., Saive, E., Hubert, A. J., J. Mol. Catal. 76:123–132 (1992)] describe $(C_6H_5)_3PRuCl_2$, (p-cumene)$RuCl_2P(C_6H_{11})_3$ and $(C_6H_5)_3PRuHCl$ as thermal catalysts for ring-opening metathesis polymerization of norbornene. Because the activity is too low, these catalysts have not found acceptance in industrial preparation. It is therefore proposed to increase the activity by the addition of diazo esters. Nothing is mentioned of a radiation-induced metathesis polymerization or of a catalytic activation by irradiation.

WO 93/20111 describes osmium- and ruthenium-carbene compounds with phosphine ligands, for example $[(H_5C_6)_3P]_2Cl_2=CH-CH=C(C_6H_5)_2$, as purely thermal catalysts for ring-opening metathesis polymerization of tight cycloolefins, in which cyclodienes, such as dicyclopentadiene, act as catalyst inhibitors and cannot be polymerized. These catalysts are difficult to prepare and are unstable to air and moisture, so that particular safety precautions must be taken for storage and processing of compositions with these catalysts. Likewise, nothing is mentioned of a radiation-induced metathesis polymerization or of a catalytic activation by irradiation.

It has been found that compositions of strained cycloolefins and a one-component catalyst can be polymerized photochemically if the composition comprises a carbene-free bivalent-cationic ruthenium or osmium compound in which at least one optionally substituted phosphine group and at least one photolabile ligand is bonded to the metal atom. Surprisingly, these compounds, which are thermally very stable per se, proved to be active catalysts for photo-induced ring-opening metathesis polymerization, the storage stability of mixtures of cycloolefins and the ruthenium or osmium compound with exclusion of light being retained, in spite of the photochemical reactivity. The compositions are insensitive to air and moisture, which offers advantages in their use. The catalysts are surprisingly already highly active in low concentrations. They are not inhibited by cycloolefins, such as, for example, biscyclopentadiene, during irradiation. The catalysts are also easy to prepare, insensitive to air and water, and soluble even in pure hydrocarbons. It has furthermore been found, surprisingly, that even weakly strained and/or very variously substituted cycloolefins can be polymerized.

Many of these catalysts are also moderate to good thermal catalysts. It has been found, surprisingly, that the catalysts mentioned either already act as thermal catalysts after brief irradiation in the presence of cycloolefins, or the thermal activity can be improved considerably by brief irradiation, so that the photochemical and the thermal polymerization can be applied in combination.

The present invention relates to a process for the photocatalytic polymerization of a strained cyclical olefin or at least two different strained cyclical olefins in the presence of a metal compound as the catalyst, which is characterized in that a photochemical ring-opening metathesis polymerization is carried out in the presence of a catalytic amount of at least one carbene-free, bivalent-cationic ruthenium or osmium compound which contains at least one phosphine group, at least one photolabile ligand, and optionally neutral ligands bonded to the metal atom, a total of 2 to 5 ligands being bonded, and which contains acid ions for balancing the charge. In the context of the invention total means the sum of phosphine groups, photolabile ligands and neutral ligands. The neutral ligands are also called nonphotolabile ligands.

The ruthenium and osmium compounds preferably contain 2 or 3 ligands in total.

The phosphine group is preferably tertiary phosphines having 3 to 40, preferably 3 to 30, and particularly preferably 3 to 24 C atoms.

The other valences of the ruthenium and osmium are preferably satisfied with heat-stable neutral ligands, a very large number of which are known. The number of neutral ligands can also exceed the stoichiometrically possible number (solvates).

The cyclical olefins can be monocyclical or polycyclical fused and/or bridged ring systems, for example with two to four rings, which are unsubstituted or substituted and can contain heteroatoms, such as, for example, O, S, N or Si, in one or more rings and/or fused aromatic or heteroaromatic rings, such as, for example, o-phenylene, o-naphthylene, o-pyridinylene or o-pyrimidinylene. The individual cyclical rings can contain 3 to 16, preferably 3 to 12, and particularly preferably 3 to 8 ring members. The cyclical olefins can contain other nonaromatic double bonds, preferably 2 to 4 such additional double bonds, depending on the ring size. The ring substituents are those which are inert, i.e. which do not impair the chemical stability and heat stability of the ruthenium or osmium compounds. The cycloolefins are strained rings or ring systems.

Heat stability in the context of the invention means that the photocatalytically active ruthenium or osmium compounds do not form active species for the ring-opening metathesis polymerization when heated. For example, at room temperature to slightly elevated temperature, such as, for example, +40° C., the catalyst cannot initiate any ring-opening metathesis polymerization within weeks with exclusion of light. During this period, only an insignificant amount of monomer (less than 0.2% by weight) is reacted. The heat stability can be determined, for example, in that a toluene solution with 20% by weight of monomer and 0.33% by weight of ruthenium or osmium catalyst is stored in the dark at 50° C. for 96 hours and any amount of polymer formed, which can be detected by a build-up in viscosity and can be determined quantitatively by precipitation in a precipitant, for example ethanol, filtration and drying, is not more than 0.5% by weight, and preferably not more than 0.2% by weight.

If the cyclical olefins contain more than one double bond, for example 2 to 4 double bonds, crosslinked polymers can also form, depending on the reaction conditions, the monomer chosen and the amount of catalyst.

In a preferred embodiment of the process according to the invention, the cycloolefins correspond to the formula I

in which $Q_1$ is a radical having at least one carbon atom which, together with the —CH=$CQ_2$ group, forms an at least 3-membered alicyclical ring which optionally contains one or more heteroatoms chosen from the group consisting of silicon, phosphorus, oxygen, nitrogen and sulfur; and which is unsubstituted or substituted by halogen, =O, —CN, —$NO_2$, $R_1R_2R_3Si$—$(O)_u$—, —COOM, —$SO_3M$, —$PO_3M$, —$COO(M_1)_{1/2}$, —$SO_3(M_1)_{1/2}$, —$PO_3(M_1)_{1/2}$, $C_1$–$C_{20}$alkyl, $C_1$–$C_{20}$hydroxyalkyl, $C_1$–$C_{20}$haloalkyl, $C_1$–$C_6$cyanoalkyl, $C_3$–$C_8$cycloalkyl, $C_6$–$C_{16}$aryl, $C_7$–$C_{16}$aralkyl, $C_3$–$C_6$heterocycloalkyl, $C_3$–$C_{16}$heteroaryl, $C_4$–$C_{16}$heteroaralkyl or $R_4$—X—; or in which two adjacent C atoms are substituted by —CO—O—CO— or —CO—$NR_5$—CO—; or in which an alicyclical, aromatic or heteroaromatic ring which is unsubstituted or substituted by halogen, —CN, —$NO_2$, $R_6R_7R_8Si$—$(O)_u$—, —COOM, —$SO_3M$, —$PO_3M$, —$COO(M_1)_{1/2}$, —$SO_3(M_1)_{1/2}$, —$PO_3(M_1)_{1/2}$, $C_1$–$C_{20}$alkyl, $C_1$–$C_{20}$haloalkyl, $C_1$–$C_{20}$hydroxyalkyl, $C_1$–$C_6$cyanoalkyl, $C_3$–$C_8$cycloalkyl, $C_6$–$C_{16}$aryl, $C_7$–$C_{16}$aralkyl, $C_3$–$C_6$heterocycloalkyl, $C_3$–$C_{16}$heteroaryl, $C_4$–$C_{16}$heteroaralkyl or $R_{13}$—$X_1$- is optionally fused onto adjacent carbon atoms of the alicyclical ring;

X and $X_1$, independently of one another are —O—, —S—, —CO—, —SO—, —$SO_2$—, —O—C(O)—, —C(O)—O—, —C(O)—$NR_5$-, —$NR_{10}$—C(O)—, —$SO_2$—O—or —O—$SO_2$—;

$R_1$, $R_2$ and $R_3$ independently of one another are $C_1$–$C_{12}$alkyl, $C_1$–$C_{12}$perfluoroalkyl, phenyl or benzyl;

$R_4$ and $R_{13}$ independently are $C_1$–$C_{20}$alkyl, $C_1$–$C_{20}$haloalkyl, $C_1$–$C_{20}$hydroxyalkyl, $C_3$–$C_8$cycloalkyl, $C_6$–$C_{16}$aryl or $C_7$–$C_{16}$aralkyl;

$R_5$ and $R_{10}$ independently of one another are hydrogen, $C_1$–$C_{12}$alkyl, phenyl or benzyl, where the alkyl groups in turn are unsubstituted or substituted by $C_1$–$C_{12}$alkoxy or $C_3$–$C_8$cycloalkyl;

$R_6$, $R_7$ and $R_8$ independently of one another are $C_1$–$C_{12}$alkyl, $C_1$–$C_{12}$perfluoroalkyl, phenyl or benzyl;

M is an alkali metal and $M_1$ is an alkaline earth metal; and u is 0 or 1;

where the alicyclical ring formed with $Q_1$ optionally contains further nonaromatic double bonds;

$Q_2$ is hydrogen, $C_1$–$C_{20}$alkyl, $C_1$–$C_{20}$haloalkyl, $C_1$–$C_{12}$alkoxy, halogen, —CN or $R_{11}$—$X_2$—;

$R_{11}$ is $C_1$–$C_{20}$alkyl, $C_1$–$C_{20}$haloalkyl, $C_1$–$C_{20}$hydroxyalkyl, $C_3$–$C_8$cycloalkyl, $C_6$–$C_{16}$aryl or $C_7$–$C_{16}$aralkyl;

$X_2$ is —C(O)—O— or —C(O)—$NR_{12}$—;

$R_{12}$ is hydrogen, $C_1$–$C_{12}$alkyl, phenyl or benzyl;

where the abovementioned cycloalkyl, heterocycloalkyl, aryl, heteroaryl, aralkyl and heteroaralkyl groups are unsubstituted or substituted by $C_1$–$C_{12}$alkyl, $C_1$–$C_{12}$alkoxy, —$NO_2$, —CN or halogen, and where the heteroatoms of the abovementioned heterocycloalkyl, heteroaryl and heteroaralkyl groups are chosen from the group consisting of —O—, —S—, —$NR_9$- and —N═; and $R_9$ is hydrogen, $C_1$–$C_{12}$alkyl, phenyl or benzyl.

Fused-on alicyclical rings preferably contain 3 to 8, particularly preferably 4 to 7, and especially preferably 5 or 6 ring C atoms.

If an asymmetric center is present in the compounds of the formula I, the compounds can occur in optically isomeric forms as a result. Some compounds of the formula I can occur in tautomeric forms (for example keto-enol tautomerism). If an aliphatic C═C double bond is present, geometric isomerism (E form or Z form) can also occur. Exo-endo configurations are furthermore also possible. Formula I thus includes all the possible stereoisomers which are present in the form of enantiomers, tautomers, diastereomers, E/Z isomers or mixtures thereof.

In the definitions of the substituents, the alkyl, alkenyl and alkynyl groups can be straight-chain or branched. The same also applies to the alkyl or each alkyl moiety of alkoxy, alkylthio, alkoxycarbonyl and further alkyl-containing groups. These alkyl groups preferably contain 1 to 12, more preferably 1 to 8, and particularly preferably 1 to 4 C atoms. These alkenyl and alkynyl groups preferably contain 2 to 12, more preferably 2 to 8, and particularly preferably 2 to 4 C atoms.

Alkyl includes, for example, methyl, ethyl, isopropyl, n-propyl, n-butyl, iso-butyl, sec-butyl, tert-butyl and the various isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl radicals.

Hydroxyalkyl includes, for example, hydroxymethyl, hydroxyethyl, 1-hydroxyisopropyl, 1-hydroxy-n-propyl, 2-hydroxy-n-butyl, 1-hydroxy-iso-butyl, 1-hydroxy-sec-butyl, 1-hydroxy-tert-butyl and the various isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl radicals.

Haloalkyl includes, for example, fluoromethyl, difluoromethyl, trifluoromethyl, chloromethyl, dichloromethyl, trichloromethyl, 2,2,2-trifluoroethyl, 2-fluoroethyl, 2-chloroethyl, 2,2,2-trichloroethyl and halogenated, in particular fluorinated or chlorinated, alkanes, such as, for example, the isopropyl, n-propyl, n-butyl, iso-butyl, sec-butyl and tert-butyl and the various isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl radicals.

Alkenyl includes, for example, propenyl, isopropenyl, 2-butenyl, 3-butenyl, isobutenyl, n-penta-2,4-dienyl, 3-methyl-but-2-enyl, n-oct-2-enyl, n-dodec-2-enyl, iso-dodecenyl, n-octadec-2-enyl and n-octadec4-enyl.

Cycloalkyl is preferably $C_5$–$C_8$cycloalkyl, in particular $C_5$- or $C_6$cycloalkyl. Some examples are cyclopropyl, dimethylcyclopropyl, cyclobutyl, cyclopentyl, methylcyclopentyl, cyclohexyl, cycloheptyl and cyclooctyl.

Cyanoalkyl includes, for example, cyanomethyl (methylnitrile [sic]), cyanoethyl (ethylnitrile [sic]), 1-cyanoisopropyl, 1-cyano-n-propyl, 2-cyano-n-butyl, 1-cyano-iso-butyl, 1-cyano-sec-butyl, 1-cyano-tert-butyl and the various isomeric cyanopentyl and -hexyl radicals.

Aralkyl preferably contains 7 to 12 C atoms, and particularly preferably 7 to 10 C atoms. It can be, for example, benzyl, phenethyl, 3-phenylpropyl, α-methylbenzyl, phenbutyl or α,α-dimethylbenzyl.

Aryl preferably contains 6 to 10 C atoms. It can be, for example, phenyl, pentalene, indene, naphthalene, azulene or anthracene.

Heteroaryl preferably contains 4 or 5 C atoms and one or two heteroatoms from the group consisting of O, S and N. It can be, for example, pyrrole, furan, thiophene, oxazole, thiazole, pyridine, pyrazine, pyrimidine, pyridazine, indole, purine or quinoline.

Heterocycloalkyl preferably contains 4 or 5 C atoms and one or two heteroatoms from the group consisting of O, S and N. It can be, for example, oxirane, azirine, 1,2-oxathiolane, pyrazoline, pyrrolidine, piperidine, piperazine, morpholine, tetrahydrofuran or tetrahydrothiophene.

Alkoxy is, for example, methoxy, ethoxy, propyloxy, i-propyloxy, n-butyloxy, i-butyloxy, sec-butyloxy and t-butyloxy.

Alkali metal in the context of the present invention is to be understood as meaning lithium, sodium, potassium, rubidium and cesium, in particular lithium, sodium and potassium.

Alkaline earth metal in the context of the present invention is to be understood as meaning beryllium, magnesium, calcium, strontium and barium, in particular magnesium and calcium.

In the above definitions, halogen is to be understood as meaning fluorine, chlorine, bromine and iodine, preferably fluorine, chlorine and bromine.

Compounds of the formula I which are particularly suitable for the process according to the invention are those in which $Q_2$ is hydrogen.

Compounds of the formula I which are furthermore preferred for the polymerization are those in which the alicyclical ring which $Q_1$ forms together with the —CH═$CQ_2$— group has 3 to 16, more preferably 3 to 12, and particularly preferably 3 to 8 ring atoms, where the ring system can be monocyclical, bicyclical, tricyclical or tetracyclical.

The process according to the invention can be carried out particularly advantageously with those compounds of the formula I in which $Q_1$ is a radical with at least one carbon atom which, together with the —CH═$CQ_2$— group, forms a 3- to 20-membered alicyclical ring which optionally contains one or more heteroatoms chosen from the group consisting of silicon, oxygen, nitrogen and sulfur; and which is unsubstituted or substituted by halogen, ═O, —CN, —$NO_2$, $R_1R_2R_3Si$—$(O)_n$—, —COOM, —$SO_3M$, —$PO_3M$, —COO$(M_1)_{1/2}$, —$SO_3(M_1)_{1/2}$, —$PO_3(M_1)_{1/2}$, $C_1$–$C_{12}$alkyl, $C_1$–$C_{12}$haloalkyl, $C_1$–$C_{12}$hydroxyalkyl, $C_1$–$C_4$cyanoalkyl, $C_3$–$C_6$cycloalkyl, $C_6$–$C_{12}$aryl, $C_7$–$C_{12}$aralkyl, $C_3$–$C_6$heterocycloalkyl, $C_3$–$C_{12}$heteroaryl, $C_4$–$C_{12}$heteroaralkyl or $R_4$—X- or in which two adjacent C atoms in this radical $Q_1$ are substituted by —CO—O—CO— or —CO—$NR_5$—CO—; or in which an alicyclical, aromatic or heteroaromatic ring which is unsubstituted or substituted by halogen, —CN, —$NO_2$, $R_6R_7R_8Si$—, —COOM, —$SO_3M$, —$PO_3M$, —COO$(M_1)_{1/2}$, —$SO_3(M_1)_{1/2}$, —$PO_3(M_1)_{1/2}$, $C_1$–$C_{12}$alkyl, $C_1$–$C_{12}$haloalkyl, $C_1$–$C_{12}$hydroxyalkyl, $C_1$–$C_4$cyanoalkyl, $C_3$–$C_6$cycloalkyl, $C_6$–$C_{12}$aryl, $C_7$–$C_{12}$aralkyl, $C_3$–$C_6$heterocycloalkyl, $C_3$–$C_{12}$heteroaryl, $C_4$–$C_{12}$heteroaralkyl or $R_{13}$—$X_1$— is optionally fused onto adjacent carbon atoms;

X and $X_1$ independently of one another are —O—, —S—, —CO—, —SO—, —$SO_2$—, —O—C(O)—, —C(O)—O—, —C(O)—$NR_5$—, —$NR_{10}$—C(O)—, —$SO_2$—O— or —O—$SO_2$—;

$R_1$, $R_2$ and $R_3$ independently of one another are $C_1$–$C_6$alkyl, $C_1$–$C_6$perfluoroalkyl, phenyl or benzyl;

M is an alkali metal and $M_1$ is an alkaline earth metal;

$R_4$ and $R_{13}$ independently of one another are $C_1$–$C_{12}$alkyl, $C_1$–$C_{12}$haloalkyl, $C_1$–$C_{12}$hydroxyalkyl, $C_3$–$C_8$cycloalkyl, $C_6$–$C_{12}$aryl or $C_7$–$C_{12}$aralkyl;

$R_5$ and $R_{10}$ independently of one another are hydrogen, $C_1$–$C_6$alkyl, phenyl or benzyl, where the alkyl groups in turn are unsubstituted or substituted by $C_1$–$C_6$alkoxy or $C_3$–$C_6$cycloalkyl;

$R_6$, $R_7$ and $R_8$ independently of one another are $C_1$–$C_6$alkyl, $C_1$–$C_6$perfluoroalkyl, phenyl or benzyl;

u is 0 or 1;

where the alicyclical ring formed with $Q_1$ optionally contains further nonaromatic double bonds;

$Q_2$ is hydrogen, $C_1$–$C_{12}$alkyl, $C_1$–$C_{12}$haloalkyl, $C_1$–$C_6$alkoxy, halogen, —CN or $R_{11}$—$X_2$—;

$R_{11}$ is $C_1$–$C_{12}$alkyl, $C_1$–$C_{12}$haloalkyl, $C_1$–$C_{12}$hydroxyalkyl, $C_3$–$C_6$cycloalkyl, $C_6$–$C_{12}$aryl or $C_7$–$C_{12}$aralkyl;

$X_2$ is —C(O)—O— or —C(O)—$NR_{12}$—; and $R_{12}$ is hydrogen, $C_1$–$C_6$alkyl, phenyl or benzyl;

where the cycloalkyl, heterocycloalkyl, aryl, heteroaryl, aralkyl and heteroaralkyl groups are unsubstituted or substituted by $C_1$–$C_6$alkyl, $C_1$–$C_6$alkoxy, —$NO_2$, —CN or halogen, and where the heteroatoms of the heterocycloalkyl, heteroaryl and heteroaralkyl groups are chosen from the group consisting of —O—, —S—, —$NR_9$- and —N=; and $R_9$ is hydrogen, $C_1$–$C_6$alkyl, phenyl or benzyl.

Preferred compounds of the formula I from this group are those in which $Q_1$ is a radical with at least one carbon atom which, together with the —CH=$CQ_2$— group, forms a 3- to 10-membered alicyclical ring which optionally contains a heteroatom chosen from the group consisting of silicon, oxygen, nitrogen and sulfur and is unsubstituted or substituted by halogen, —CN, —$NO_2$, $R_1R_2R_3$Si—, —COOM, —$SO_3$M, —$PO_3$M, —COO(M$_1$)$_{1/2}$, —$SO_3$(M$_1$)$_{1/2}$, —$PO_3$(M$_1$)$_{1/2}$, $C_1$–$C_6$alkyl, $C_1$–$C_6$haloalkyl, $C_1$–$C_6$hydroxyalkyl, $C_1$–$C_4$cyanoalkyl, $C_3$–$C_6$cycloalkyl, phenyl, benzyl or $R_4$—X—; or in which an alicyclical, aromatic or heteroaromatic ring which is unsubstituted or substituted by halogen, —CN, —$NO_2$, $R_6R_7R_8$Si—, —COOM, —$SO_3$M, —$PO_3$M, —COO(M$_1$)$_{1/2}$, —$SO_3$(M$_1$)$_{1/2}$, —$PO_3$(M$_1$)$_{1/2}$, $C_1$–$C_6$alkyl, $C_1$–$C_6$haloalkyl, $C_1$–$C_6$hydroxyalkyl, $C_1$–$C_4$cyanoalkyl, $C_3$–$C_6$cycloalkyl, phenyl, benzyl or $R_{13}$—$X_1$— is optionally fused onto adjacent carbon atoms;

$R_1$, $R_2$ and $R_3$ independently of one another are $C_1$–$C_4$alkyl, $C_1$–$C_4$perfluoroalkyl, phenyl or benzyl;

M is an alkali metal and $M_1$ is an alkaline earth metal;

$R_4$ and $R_{13}$ independently of one another are $C_1$–$C_6$alkyl, $C_1$–$C_6$haloalkyl, $C_1$–$C_6$hydroxyalkyl or $C_3$–$C_6$cycloalkyl;

X and $X_1$ independently of one another are —O—, —S—, —CO—, —SO— or —$SO_2$—;

$R_6$, $R_7$ and $R_7$ independently of one another are $C_1$–$C_4$alkyl, $C_1$–$C_4$perfluoroalkyl, phenyl or benzyl;

and $Q_2$ is hydrogen.

The process according to the invention is particularly suitable for polymerization of norbornene and norbornene derivatives. Particularly preferred compounds from these norbornene derivatives are those which correspond either to the formula II

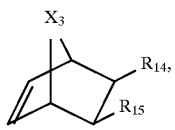

(II)

in which $X_3$ is —$CHR_{16}$—, oxygen or sulfur;

$R_{14}$ and $R_{15}$ independently of one another are hydrogen, —CN, trifluoromethyl, $(CH_3)_3$Si—O—, $(CH_3)_3$Si— or —$COOR_{17}$; and $R_{16}$ and $R_{17}$ independently of one another are hydrogen, $C_1$–$C_{12}$-alkyl, phenyl or benzyl;

or to the formula III

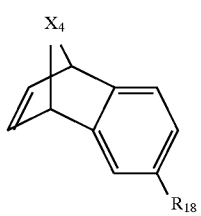

(III)

in which $X_4$ is —$CHR_{19}$—, oxygen or sulfur;

$R_{19}$ is hydrogen, $C_1$–$C_{12}$alkyl, phenyl or benzyl; and $R_{18}$ is hydrogen, $C_1$–$C_6$alkyl or halogen;

or to the formula IV

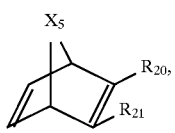

(IV)

in which $X_5$ is —$CHR_{22}$—, oxygen or sulfur;

$R_{22}$ is hydrogen, $C_1$–$C_{12}$alkyl, phenyl or benzyl;

$R_{20}$ and $R_{21}$ independently of one another are hydrogen, CN, trifluoromethyl, $(CH_3)_3$Si—O—, $(CH_3)_3$Si— or —$COOR_{23}$; and $R_{23}$ is hydrogen, $C_1$–$C_{12}$alkyl, phenyl or benzyl;

or to the formula V

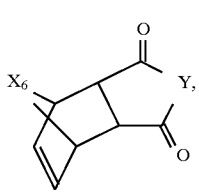

(V)

in which $X_6$ is —$CHR_{24}$—, oxygen or sulfur;

$R_{24}$ is hydrogen, $C_1$–$C_{12}$alkyl, phenyl or benzyl;

Y is oxygen or
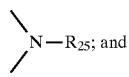
$R_{25}$ is hydrogen, methyl, ethyl or phenyl.
The following compounds of the formula I are particularly suitable for the polymerization process according to the invention, bi- and polycyclical systems being accessible by Diels-Alder reactions:
 (1)
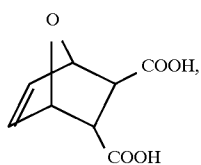 (2)
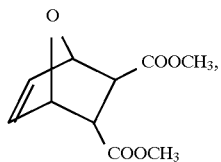 (3)
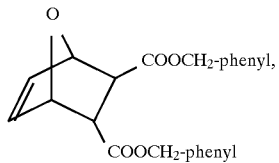 (4)
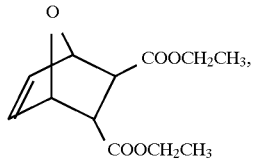 (5)
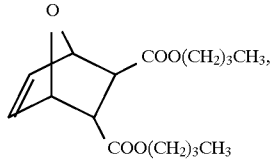 (6)
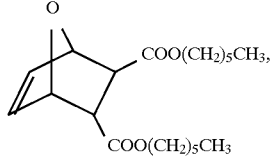 (7)
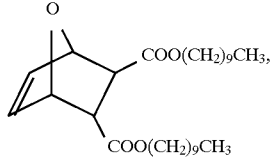 (8)
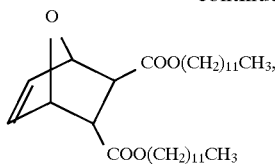 (9)
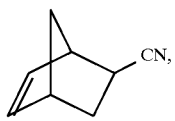 (10)
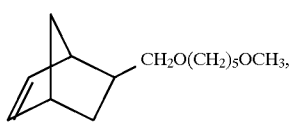 (11)
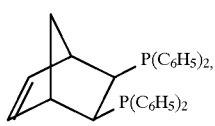 (12)
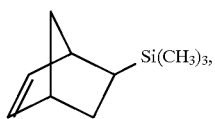 (13)
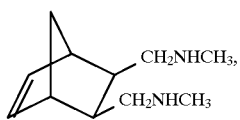 (14)
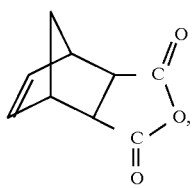 (15)
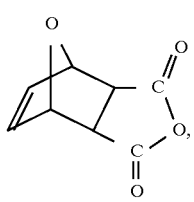 (16)
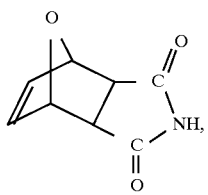 (17)
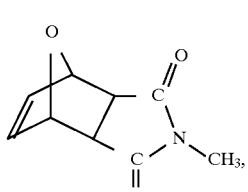 (18)

(19) 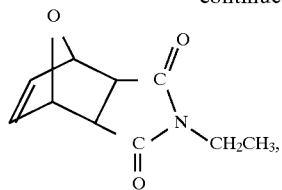
(20) 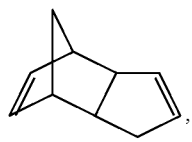
(21) 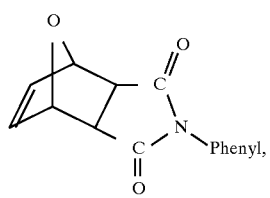
(22) 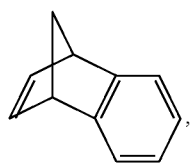
(23) 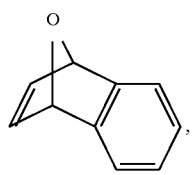
(24) 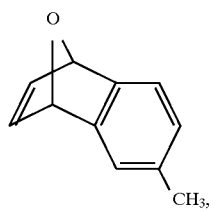
(25) 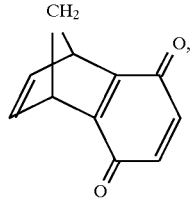
(26) 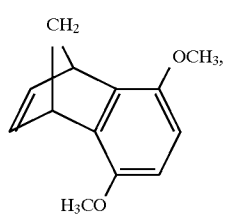
(27) 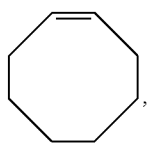
(28) 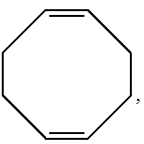
(29) 
(30) 
(31) 
(32) 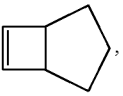
(33) 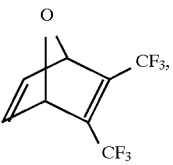
(34) 
(35) 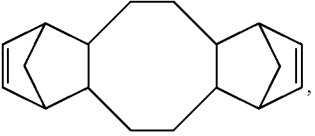
(36) 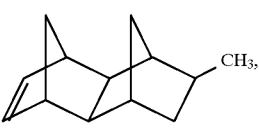
(37) 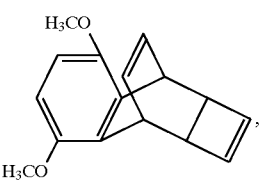
(38) 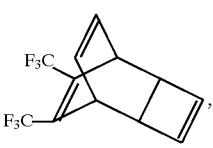

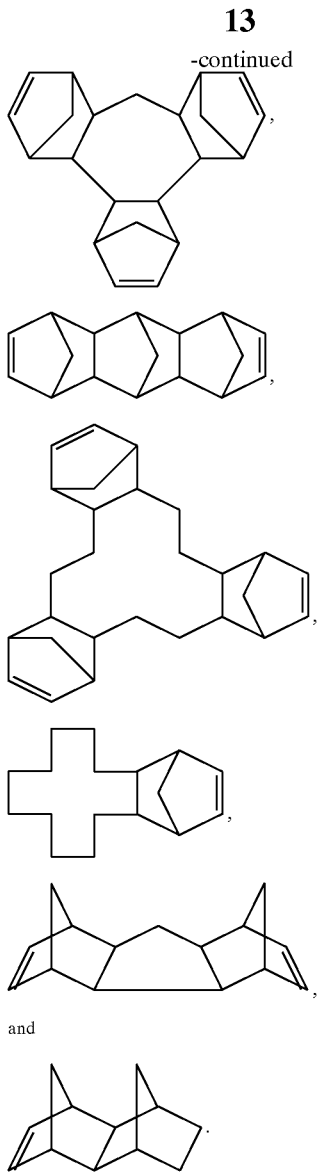

(39)

(40)

(41)

(42)

(43)

and (44)

In the ruthenium and osmium compounds to be used according to the invention, a monophosphine can advantageously be bonded once, twice or three times, preferably once, and a disphosphene once, to the metal atom. In the ruthenium and osmium catalysts, preferably 1 to 4, more preferably 1 to 3, photolabile ligands are bonded, and one photolabile ligand is particularly preferred. Other valences of the ruthenium and osmium, if present, are preferably satisfied by neutral ligands. The phosphine ligands preferably correspond to the formulae VII and VIIa, $$PR_{26}R_{27}R_{28} \quad \text{(VII)},$$

$$R_{26}R_{27}P{-}Z_1{-}PR_{26}R_{27} \quad \text{(VIIa)},$$

in which $R_{26}$, $R_{27}$ and $R_{28}$ independently of one another are H, $C_1$–$C_{20}$alkyl, $C_4$–$C_{12}$cycloalkyl which is unsubstituted or substituted by $C_1$–$C_6$alkyl, $C_1$–$C_6$haloalkyl or $C_1$–$C_6$alkoxy; or $C_6$–$C_{16}$aryl which is unsubstituted or substituted by $C_1$–$C_6$alkyl, $C_1$–$C_6$haloalkyl or $C_1$–$C_6$alkoxy; or $C_7$–$C_{16}$aralkyl which is unsubstituted or substituted by $C_1$–$C_6$alkyl, $C_1$–$C_6$haloalkyl or $C_1$–$C_6$alkoxy; the radicals $R_{26}$ and $R_{27}$ together are tetra- or pentamethylene which is unsubstituted or substituted by $C_1$–$C_6$alkyl, $C_1$–$C_6$haloalkyl or $C_1$–$C_6$alkoxy, or tetra- or pentamethylene which is unsubstituted or substituted by $C_1$–$C_6$alkyl, $C_1$–$C_6$haloalkyl or $C_1$–$C_6$alkoxy and fused with 1 or 2 1,2-phenylene, and $R_{28}$ has the abovementioned meaning; and $Z_1$ is linear or branched $C_2$–$C_{12}$alkylene which is unsubstituted or substituted by $C_1$–$C_4$alkoxy, 1,2- or 1,3-cycloalkylene which has 4 to 8 C atoms and is unsubstituted or substituted by $C_1$–$C_4$alkyl or $C_1$–$C_4$alkoxy, or 1,2 or 1,3-heterocycloalkylene which has 5 or 6 ring members and one heteroatom from the group consisting of O or N and is unsubstituted or substituted by $C_1$–$C_4$alkyl or $C_1$–$C_4$alkoxy.

The radicals $R_{26}$, $R_{27}$ and $R_{28}$ are preferably identical radicals.

If $R_{26}$, $R_{27}$ and $R_{28}$ are substituted, the substituents are preferably $C_1$–$C_4$alkyl, $C_1$–$C_4$haloalkyl or $C_1$–$C_4$alkoxy. Halogen is preferably Cl, and particularly preferably F. Examples of preferred substituents are methyl, methoxy, ethyl, ethoxy and trifluoromethyl. $R_{26}$, $R_{27}$ and $R_{28}$ are preferably substituted by 1 to 3 substituents.

Alkyl $R_{26}$, $R_{27}$ and $R_{28}$ can be linear or branched and can preferably contain 1 to 12, more preferably 1 to 8, and particularly preferably 1 to 6 C atoms. Examples of alkyl are methyl, ethyl, n- and i-propyl, n-, i- and t-butyl and the isomers of pentyl, hexyl, heptyl, octyl, nonyl, decyl, undecyl, dodecyl, tridecyl, tetradecyl, pentadecyl, hexadecyl, heptadecyl, octadecyl and eicosyl. Preferred examples are methyl, ethyl, n- and i-propyl, n-, i- and t-butyl, 1-, 2- or 3-pentyl and 1-, 2-, 3- or 4-hexyl.

Cycloalkyl $R_{26}$, $R_{27}$ and R28 is preferably $C_5$–$C_8$cycloalkyl, and particularly preferably $C_5$- or $C_6$cycloalkyl. Some examples are cyclobutyl, cycloheptyl, cyclooctyl and, in particular, cyclopentyl and cyclohexyl. Examples of substituted cycloalkyl are methyl-, dimethyl-, trimethyl-, methoxy-, dimethoxy-, trimethoxy-, trifluoromethyl-, bistrifluoromethyl and tristrifluoromethyl-cyclopentyl and -cyclohexyl.

Aryl $R_{26}$, $R_{27}$ and $R_{28}$ is preferably $C_6$–$C_{12}$aryl, and particularly preferably phenyl or naphthyl. Examples of substituted aryl are methyl-, dimethyl-, trimethyl-, methoxy-, dimethoxy-, trimethoxy-, trifluoromethyl-, bistrifluoromethyl and tristrifluoromethylphenyl.

Aralkyl $R_{26}$, $R_{27}$ and $R_{28}$ is preferably $C_7$–$C_{13}$aralkyl, where the alkylene group in the aralkyl is preferably methylene. The aralkyl is particularly preferably benzyl. Examples of substituted aralkyl are methyl-, dimethyl-, trimethyl-, methoxy-, dimethoxy-, trimethoxy-, trifluoromethyl-, bistrifluoromethyl and tristrifluoromethyl-benzyl.

Examples of optionally substituted or fused tetra- or pentamethylene bonded to the P atom are

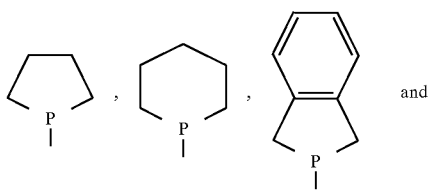

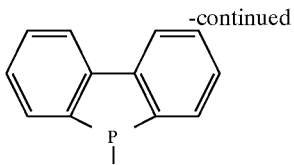

Other suitable phosphines are cycloaliphatics which have 6 to 8 ring carbon atoms and are bridged with a =PRa group, for example

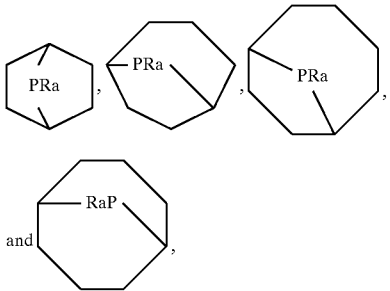

in which Ra is $C_1-C_6$alkyl, cyclohexyl, benzyl, or phenyl which is unsubstituted or substituted by 1 or 2 $C_1-C_4$alkyl.

Linear or branched alkylene $Z_1$ is preferably 1,2-alkylene or 1,3-alkylene having preferably 2 to 6 C atoms, for example ethylene, 1,2-propylene or 1,2-butylene.

Examples of cycloalkylene $Z_1$ are 1,2- and 1,3-cyclopentylene and 1,2- or 1,3-cyclohexylene. Examples of heterocycloalkylene $Z_1$ are 1,2- and 1,3-pyrrolidine, 1,2- and 1,3-piperidine and 1,2- and 1,3-tetrahydrofuran.

In a preferred embodiment, the phosphine ligands correspond to the formula VII in which $R_{26}$, $R_{27}$ and $R_{28}$ independently of one another are H, $C_1-C_6$alkyl, cyclopentyl or cyclohexyl which are unsubstituted or substituted by $C_1-C_4$alkyl, or phenyl which is unsubstituted or substituted by $C_1-C_4$alkyl, $C_1-C_4$alkoxy or trifluoromethyl, or benzyl which is unsubstituted or substituted by $C_1-C_4$alkyl, $C_1-C_4$alkyl [sic] $C_1-C_4$alkoxy or trifluoromethyl. Particularly preferred examples of phosphine ligands of the formula VII are $(C_6H_5)_3P$, $(C_6H_5CH_2)_3P$, $(C_5H_{11})_3P$, $(CH_3)_3P$, $(C_2H_5)_3P$, $(n-C_3H_7)_3P$, $(i-C_3H_7)_3P$, $(n-C_4H_9)_3P$, $(C_6H_5)_2HP$, $(C_6H_5)_2HP$, $(C_5H_{11})_2HP$, $(CH_3)_2HP$, $(C_2H_5)_2HP$, $(n-C_3H_7)_2HP$, $(i-C_3H_7)_2HP$, $(n-C_4H_9)_2HP$, $(C_6H_5)H_2P$, $(i-C_3H_7)H_2P$, $(C_6H_5CH_2)H_2P$, $(C_5H_{11})H_2P$, $(CH_3)H_2P$, $(C_2H_5)H_2P$, $(n-C_3H_7)H_2P$, $(n-C_4H_9)H_2P$, $PH_3$, $(2\text{-methyl-}C_6H_4)_3P$, $(3\text{-}CH_3\text{-}C_6H_4)_3P$, $(4\text{-}CH_3\text{-}C_6H_4)_3P$, $(2,4\text{-di-}CH_3\text{-}C_6H_3)_3P$, $(2,6\text{-di-}CH_3\text{-}C_6H_3)_3P$, $(2\text{-}C_2H_5\text{-}C_6H_4)_3P$, $(3\text{-}C_2H_5\text{-}C_6H_4)_3P$, $(4\text{-}C_2H_5\text{-}C_6H_4)_3P$, $(2\text{-}n\text{-}C_3H_7\text{-}C_6H_4)_3P$, $(3\text{-}n\text{-}C_3H_7\text{-}C_6H_4)_3P$, $(4\text{-}n\text{-}C_3H_7\text{-}C_6H_4)_3P$, $(2\text{-}i\text{-}C_3H_7\text{-}C_6H_4)_3P$, $(3\text{-}i\text{-}C_3H_7\text{-}C_6H_4)_3P$, $(4\text{-}i\text{-}C_3H_7\text{-}C_6H_4)_3P$, $(2\text{-}n\text{-}C_4H_9\text{-}C_6H_4)_3P$, $(3\text{-}n\text{-}C_4H_9\text{-}C_6H_4)_3P$, $(4\text{-}n\text{-}C_4H_9\text{-}C_6H_4)_3P$, $(2\text{-}i\text{-}C_4H_9\text{-}C_6H_4)_3P$, $(3\text{-}i\text{-}C_4H_9\text{-}C_6H_4)_3P$, $(4\text{-}i\text{-}C_4H_9\text{-}C_6H_4)_3P$, $(2\text{-}t\text{-}C_4H_9\text{-}C_6H_4)_3P$, $(3\text{-}t\text{-}C_4H_9\text{-}C_6H_4)_3P$, $(4\text{-}t\text{-}C_4H_9\text{-}C_6H_4)_3P$, $(2\text{-}CH_3\text{-}6\text{-}t\text{-}C_4H_9\text{-}C_6H_3)_3P$, $(3\text{-}CH_3\text{-}6\text{-}t\text{-}C_4H_9\text{-}C_6H_3)_3P$, $(3\text{-}CH_3\text{-}6\text{-}t\text{-}C_4H_9\text{-}C_6H_3)_3P$, $(2,6\text{-di-}t\text{-}C_4H_9\text{-}C_6H_3)_3P$ $(2,3\text{-di-}t\text{-}C_4H_9\text{-}C_6H_3)_3P$ and $(2,4\text{-di-}t\text{-}C_4H_9\text{-}C_6H_3)_3P$.

Organic or inorganic compounds, atoms or ions which are coordinated onto a metal center are designated as ligands for the ruthenium and osmium compounds to be used according to the invention.

Photolabile ligand in the context of the present invention means that when the catalyst is irradiated by light in the visible or ultraviolet range of the spectrum, the ligand is dissociated from the catalyst and a catalytically active species for the metathesis polymerization is formed. Nonionic photolabile ligands are preferred according to the invention.

The photolabile ligands can be, for example, nitrogen ($N_2$), monocyclical, polycyclical or fused arenes which have 6 to 24, preferably 6 to 18, and particularly preferably 6 to 12 C atoms and are unsubstituted or substituted by OH, $C_1-C_4$alkyl, $C_1-C_4$alkoxy, $C_6-C_{12}$aryl or halogen, or monocyclical heteroarenes, fused heteroarenes or fused arene-heteroarenes which have 3 to 22, preferably 4 to 16, and in particular 4 to 10 C atoms and 1 to 3 heteroatoms chosen from the group consisting of O, S and N and are unsubstituted or substituted by $C_1-C_4$alkyl, $C_1-C_4$alkoxy or halogen; or aliphatic, cycloaliphatic, aromatic or araliphatic nitriles which have 1 to 22, preferably 1 to 18, particularly preferably 1 to 12, and especially preferably 1 to 7 C atoms and are unsubstituted or substituted by $C_1-C_4$alkyl, $C_1-C_4$alkoxy or halogen. The preferred substituents are methyl, ethyl, methoxy, ethoxy, fluorine, chlorine and bromine. The arenes and heteroarenes are preferably substituted by one to three radicals. Preferred heteroarenes are the electron-rich heteroarenes.

Some examples of arenes and heteroarenes are benzene, cumene, biphenyl, naphthalene, anthracene, acenaphthene, fluorene, phenanthrene, pyrene, chrysene, fluoranthrene, furan, thiophene, pyrrole, pyridine, γ-pyran, γ-thiopyran, pyrimidine, pyrazine, indole, coumarone, thionaphthene, carbazole, dibenzofuran, dibenzothiophene, pyrazole, imidazole, benzimidazole, oxazole, thiazole, isoxazole, isothiazole, quinoline, isoquinoline, acridine, chromene, phenazine, phenoxazine, phenothiazine, triazine, thianthrene and purine. Preferred arenes and heteroarenes are unsubstituted or substituted benzene, naphthalene, thiophene and benzothiophene. The arene is especially preferably benzene which is unsubstituted or substituted by 1 to 3 $C_1-C_4$alkyl, and the heteroarene is preferably thiophene.

The nitriles can be substituted, for example by methoxy, ethoxy, fluorine or chlorine; the nitriles are preferably unsubstituted. The alkylnitriles are preferably linear. Some examples of nitriles are acetonitrile, propionitrile, butyronitrile, pentylnitrile, hexylnitrile, cyclopentyl- and cyclohexylnitrile, benzonitrile, methylbenzonitrile, benzylnitrile and naphthylnitrile. The nitriles are preferably linear $C_1-C_4$alkylnitriles or benzonitrile. Of the alkylnitriles, acetonitrile is particularly preferred.

In a preferred sub-group, the photolabile ligands are $N_2$, benzene which is unsubstituted or substituted by one to three $C_1-C_4$alkyl, thiophene, benzonitrile or acetonitrile.

Nonphotolabile ligand (also called highly coordinating ligand) in the context of the present invention means that the ligand does not dissociate, or dissociates to only an insignificant extent, from the catalyst on irradiation of the catalyst in the visible or near ultraviolet range of the spectrum.

The nonphotolabile ligands can be, for example, solvating inorganic and organic compounds which contain the heteroatoms O, S or N and are often also used as solvents, or cyclopentadienyl or indenyl which are unsubstituted or substituted by $C_1-C_4$alkyl, $C_1-C_4$alkoxy, $(C_1-C_4$alkyl$)_3$Si or $(C_1-C_4$alkyl$)_3$SiO—. Examples of such compounds are $H_2O$, $H_2S$, $NH_3$; optionally halogenated, in particular fluorinated or chlorinated, aliphatic or cycloaliphatic alcohols or mercaptans having 1 to 18, preferably 1 to 12, and particularly preferably 1 to 6 C atoms, aromatic alcohols or thiols having 6 to 18, preferably 6 to 12 C atoms, araliphatic alcohols or thiols having 7 to 18, preferably 7 to 12 C atoms; open-chain or cyclical and aliphatic, araliphatic or aromatic ethers, thioethers, sulfoxides, sulfones, ketones, aldehydes, carboxylic acid esters, lactones, optionally N—$C_1-C_4$monoor -dialkylated carboxylic acid amides having 2 to 20, preferably 2 to 12, and in particular 2 to 6 C atoms, and optionally N—$C_1$–$C_4$alkylated lactams; open-chain or cyclical and aliphatic, araliphatic or aromatic primary, secondary and tertiary amines having 1 to 20, preferably 1 to 12, and particularly preferably 1 to 6 C atoms; and cyclopentadienyls, such as, for example, cyclopentadienyl, indenyl and mono- or polymethylated or trimethylsilylated cyclopentadienyls or indenyls.

Examples of such nonphotolabile ligands are methanol, ethanol, n- and i-propanol, n-, i- and t-butanol, 1,1,1-trifluoroethanol, bistrifluoromethylmethanol, tristrifluoromethylmethanol, pentanol, hexanol, methyl- or ethylmercaptan, cyclopentanol, cyclohexanol, cyclohexylmercaptan, phenol, methylphenol, fluorophenol, phenylmercaptan, benzyimercaptan, benzyl alcohol, diethyl ether, dimethyl ether, diisopropyl ether, di-n- or di-t-butyl ether, tetrahydrofuran, tetrahydropyran, dioxane, diethyl thioether, tetrahydrothiophene, dimethyl sulfoxide, diethyl sulfoxide, tetra- and pentamethylene sulfoxide, dimethyl sulfone, diethyl sulfone, tetra- and pentamethylene sulfone, acetone, methyl ethyl ketone, diethyl ketone, phenyl methyl ketone, methyl isobutyl ketone, benzyl methyl ketone, acetaldehyde, propionaldehyde, trifluoroacetaldehyde, benzaldehyde, ethyl acetate, butyrolactone, dimethylformamide, dimethylacetamide, pyrrolidone and N-methylpyrrolidone, indenyl, cyclopentadienyl, methyl- or dimethyl- or pentamethylcyclopentadienyl and trimethylsilylcyclopentadienyl.

The primary amines can correspond to the formula $R_{29}NH_2$, the secondary amines can correspond to the formula $R_{29}R_{30}NH$ and the tertiary amines can correspond to the formula $R_{29}R_{30}R_{31}N$, in which $R_{29}$ is $C_1$–$C_{18}$alkyl, $C_5$- or $C_6$cycloalkyl which is unsubstituted or substituted by $C_1$–$C_4$alkyl or $C_1$–$C_4$alkoxy, or $C_6$–$C_{18}$aryl or $C_7$–$C_{12}$aralkyl which are unsubstituted or substituted by $C_1$–$C_4$alkyl or $C_1$–$C_4$alkoxy, $R_{30}$ independently has the meaning of $R_{29}$, or $R_{29}$ and $R_{30}$ together are tetramethylene, pentamethylene, 3-oxa-1,5-pentylene or —$CH_2$—$CH_2$—NH—$CH_2$—$CH_2$— or —$CH_2$—$CH_2$—N($C_1$–$C_4$alkyl)—$CH_2$—$CH_2$—, and $R_{31}$ independently has the meaning of $R_{29}$. The alkyl preferably contains 1 to 12, and particularly preferably 1 to 6 C atoms. The aryl preferably contains 6 to 12 C atoms and the aralkyl preferably contains 7 to 9 C atoms. Examples of amines are methyl-, dimethyl-, trimethyl-, ethyl-, diethyl-, triethyl-, methyl-ethyl, dimethyl-ethyl, n-propyl-, di-n-propyl-, tri-n-butyl-, cyclohexyl-, phenyl- and benzylamine, and pyrrolidine, N-methylpyrrolidine, piperidine, piperazine, morpholine and N-methylmorpholine.

In a preferred subgroup, the nonphotolabile ligands are $H_2O$, $NH_3$ and $C_1$–$C_4$alkanols which are unsubstituted or partly or completely fluorinated, or cyclopentadienyl. $H_2O$, methanol and ethanol are especially preferred.

In a preferred embodiment, the Ru and Os catalysts to be used according to the invention contain only photolabile ligands, phosphine groups and anions for balancing the charge. They especially preferably contain an arene group as a photolabile ligand, a tertiary phosphine group and mono- or bivalent anions for balancing the charge.

Suitable anions of inorganic or organic acids are, for example, hydride ($H^\ominus$), halide (for example $F^\ominus$, $Cl^\ominus$ $Br^\ominus$ and $^\ominus$), the anion of an oxygen acid and $BF_4^\ominus$, $PF_6^\ominus$, $SbF_6^\ominus$ or $AsF_6^\ominus$. It should be mentioned that the abovementioned cyclopentadienyl is a ligand and an anion.

Further suitable anions are $C_1$–$C_{12}$-, preferably $C_1$–$C_6$-, and particularly preferably $C_1$–$C_4$alcoholates, which, in particular, are branched, for example correspond to the formula $R_xR_yR_zC$—$O^\ominus$, in which $R_x$ is H or $C_1$–$C_{10}$alkyl, $R_y$ is $C_1$–$C_{10}$alkyl and $R_z$ is $C_1$–$C_{10}$alkyl or phenyl, and the sum of the C atoms of $R_x$, $R_y$ and $R_z$ is 11. Examples are, in particular, i-propyloxy and t-butyloxy.

Other suitable anions are $C_3$–$C_{18}$-, preferably $C_5$–$C_{14}$-, and particularly preferably $C_5$–$C_{12}$acetylides, which can correspond to the formula $R_w$—$C\equiv C^\ominus$, in which $R_w$ is $C_1$–$C_{16}$alkyl, preferably α-branched $C_3$–$C_{12}$alkyl, for example of the formula $R_xR_yR_zC$—, or is phenyl or benzyl which are unsubstituted or substituted by 1 to 3 $C_1$–$C_4$alkyl or $C_1$–$C_4$alkoxy. Some examples are i-propyl-, i- and t-butyl-, phenyl-, benzyl-, 2-methyl-, 2,6-dimethyl-, 2-i-propyl-, 2-i-propyl-6-methyl-, 2-t-butyl-, 2,6-di-t-butyl- and 2-methyl-6-t-butylphenylacetylide.

The anions of oxygen acids can be, for example, sulfate, phosphate, perchlorate, perbromate, periodate, antimonate, arsenate, nitrate, carbonate, the anion of a $C_1$–$C_8$carboxylic acid, such as, for example, formate, acetate, propionate, butyrate, benzoate, phenylacetate or mono-, di- or trichloro- or -fluoroacetate, sulfonates, such as, for example, methylsulfonate, ethylsulfonate, propylsulfonate, butylsulfonate, trifluoromethylsulfonate (triflate) or phenylsulfonate or benzylsulfonate which are optionally substituted by $C_1$–$C_4$alkyl, $C_1$–$C_4$alkoxyl or halogen, in particular fluorine, chlorine or bromine, such as, for example, tosylate, mesylate, brosylate, p-methoxy- or p-ethoxyphenylsulfonate, pentafluorophenylsulfonate or 2,4,6-triisopropylsulfonate, and phosphates, such as, for example, methylphosphonate, ethylphosphonate, propylphosphonate, butylphosphonate, phenylphosphonate, p-methylphenylphosphonate or benzylphosphonate.

$H^\ominus$, $F^\ominus$, $Cl^\ominus$, $Br^\ominus$, $BF_4^\ominus$, $PF_6^\ominus$, $SbF_6^\ominus$, $AsF_6^\ominus$, $CF_3SO_3^\ominus$, $C_6H_5$—$SO_3^\ominus$, 4-methyl-$C_6H_5$—$SO_3^\ominus$, 2,6-dimethyl-$C_6H_5$—$SO_3^\ominus$, 2,4,6-trimethyl-$C_6H_5$—$SO_3^\ominus$ and 4-$CF_3$–$C_6H_5$—$SO_3^\ominus$ and cyclopentadienyl ($Cp^\ominus$) are particularly preferred.

The number of nonphotolabile ligands depends on the number of phosphine groups, the size of the nonphotolabile ligands and the number of photolabile ligands.

In a preferred embodiment, the ruthenium and osmium compounds particularly preferably correspond to the formulae VIII, VIIIa, VIIIb, VIIIc, VIIId, VIIIe or VIIIf

    (VIII),

    (VIIIa),

    (VIIIb),

    (VIIIc),

    (VIIId),

    (VIIIe),

    (VIIIf), in which $R_{32}$ is a tertiary phosphine of the formula VII or VIIa;

Me is Ru or Os;

n is the numbers 1, 2 or 3;

Z is the anion of an inorganic or organic acid;

(a) $L_1$ is an arene or heteroarene ligand;

(b) $L_2$ is a monovalent photolabile ligand which differs from $L_1$; and (c) $L_3$ is a monovalent nonphotolabile ligand.

For $R_{32}$, $L_1$, $L_2$ and $L_3$, the preferences stated above for the individual meanings apply.

In the formulae VIII to VIIIf, n is preferably 1 or 2 and especially 1. For $R_{32}$, the preferences stated for the phosphine ligands of the formula VII apply, and in particular the phosphines are tertiary phosphines.

Ruthenium and osmium compounds which are especially preferably used in the process according to the invention are those of the formulae IX, IXa, IXb, IXc, IXd, IXe or IXf

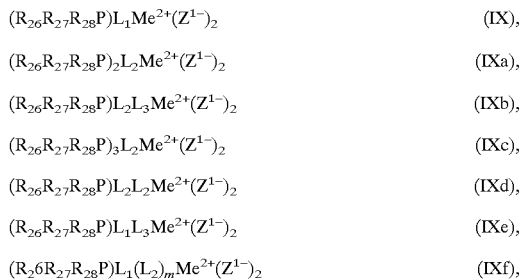

$$(R_{26}R_{27}R_{28}P)L_1Me^{2+}(Z^{1-})_2 \quad (IX),$$

$$(R_{26}R_{27}R_{28}P)_2L_2Me^{2+}(Z^{1-})_2 \quad (IXa),$$

$$(R_{26}R_{27}R_{28}P)L_2L_3Me^{2+}(Z^{1-})_2 \quad (IXb),$$

$$(R_{26}R_{27}R_{28}P)_3L_2Me^{2+}(Z^{1-})_2 \quad (IXc),$$

$$(R_{26}R_{27}R_{28}P)L_2L_2Me^{2+}(Z^{1-})_2 \quad (IXd),$$

$$(R_{26}R_{27}R_{28}P)L_1L_3Me^{2+}(Z^{1-})_2 \quad (IXe),$$

$$(R_{26}R_{27}R_{28}P)L_1(L_2)_mMe^{2+}(Z^{1-})_2 \quad (IXf),$$

in which

Me is Ru or Os;

Z in formulae IX to IXe is $H^{\ominus}$, cyclopentadienyl, $Cl^{\ominus}$, $Br^{\ominus}$, $BF_4^{\ominus}$, $PF_6^{\ominus}$, $SbF_6^{\ominus}$, $AsF_6^{\ominus}$, $CF_3SO_3^{\ominus}$, $C_6H_5$—$SO_3^{\ominus}$, 4-methyl-$C_6H_5$—$SO_3^{\ominus}$, 2,6-dimethyl-$C_6H_5$—$SO_3^{\ominus}$, 2,4,6-trimethyl-$C_6H_5$—$SO_3^{\ominus}$ or 4-$CF_3$-$C_6H_5$—$SO_3^{\ominus}$, and in formula IXf is $H^{\ominus}$, cyclopentadienyl, $BF_4^{\ominus}$, $PF_6^{\ominus}$, $SbF_6^{\ominus}$, $AsF_6^{\ominus}$, $CF_3SO_3^{\ominus}$, $C_6H_5$—$SO_3^{\ominus}$, 4-methyl-$C_6H_5$—$SO_3^{\ominus}$, 2,6-dimethyl-$C_6H_5$—$SO_3^{\ominus}$, 2,4,6-trimethyl-$C_6H_5$—$SO_3^{\ominus}$ or 4-$CF_3$-$C_6H_5$—$SO_3^{\ominus}$;

m is 1 or 2;

$R_{26}$, $R_{27}$ and $R_{28}$ independently of one another are $C_1$–$C_6$alkyl or -alkoxy, cyclopentyl or cyclohexyl or cyclopentyloxy or cyclohexyloxy which are unsubstituted or substituted by 1 to 3 $C_1$–$C_4$alkyl, or phenyl or benzyl or phenyloxy or benzyloxy which are unsubstituted or substituted by 1 to 3 $C_1$–$C_4$alkyl;

$L_1$ is $C_6$–$C_{16}$arene or $C_5$–$C_{16}$heteroarene which are unsubstituted or substituted by 1 to 3 $C_1$–$C_4$alkyl, $C_1$–$C_4$alkoxy, —OH, —F or Cl;

$L_2$ is $C_1$–$C_6$alkyl-CN, benzonitrile or benzylnitrile; and $L_3$ is $H_2O$ or $C_1$–$C_6$alkanol.

Preferred arenes and heteroarenes are benzene, toluene, xylene, trimethylbenzene, naphthalene, biphenyl, anthracene, acenaphthene, fluorene, phenanthrene, pyrene, chrysene, fluoranthrene, furan, thiophene, pyrrole, pyridine, γ-pyran, γ-thiopyran, pyrimidine, pyrazine, indole, coumarone, thionaphthene, carbazole, dibenzofuran, dibenzothiophene, pyrazole, imidazole, benzimidazole, oxazole, thiazole, isoxazole, isothiazole, quinoline, isoquinoline, acridine, chromene, phenazine, phenoxazine, phenothiazine, triazines, thianthrene and purine. More preferred arenes and heteroarenes are benzene, naphthalene, cumene, thiophene and benzothiophene. The arene is especially preferably benzene or or [sic] a benzene which is substituted by $C_1$–$C_4$alkyl, such as, for example, toluene, xylene, isopropylbenzene, tert-butylbenzene or cumene, and the heteroarene is preferably thiophene.

If the preparation of the ruthenium and osmium catalysts is carried out in solvents which can coordinate to a metal atom, such as, for example, in alkanols, solvated Ru/Os cation complexes which are also included in the scope of the use according to the invention can form.

Some examples of ruthenium and osmium compounds to be used according to the invention are [Tos is tosylate]: $(C_6H_{11})_2HPRu(p\text{-cumene})Cl_2$, $(C_6H_{11})_3PRu(p\text{-cumene})Cl_2$, $(C_6H_{11})_3PRu(p\text{-cumene})(Tos)_2$, $(C_6H_{11})_3PRu(p\text{-cumene})$

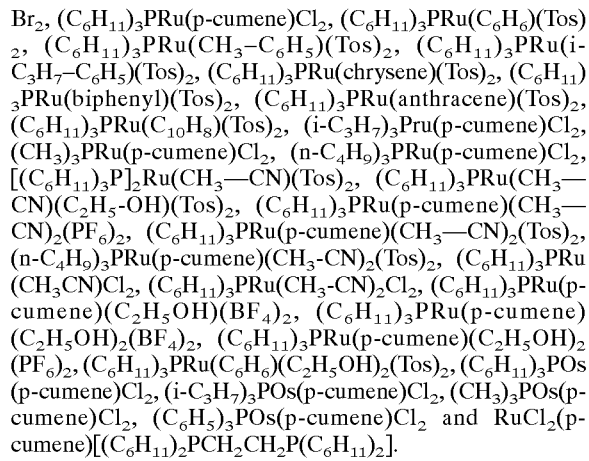

$Br_2$, $(C_6H_{11})_3PRu(p\text{-cumene})Cl_2$, $(C_6H_{11})_3PRu(C_6H_6)(Tos)_2$, $(C_6H_{11})_3PRu(CH_3\text{-}C_6H_5)(Tos)_2$, $(C_6H_{11})_3PRu(i\text{-}C_3H_7\text{-}C_6H_5)(Tos)_2$, $(C_6H_{11})_3PRu(chrysene)(Tos)_2$, $(C_6H_{11})_3PRu(biphenyl)(Tos)_2$, $(C_6H_{11})_3PRu(anthracene)(Tos)_2$, $(C_6H_{11})_3PRu(C_{10}H_8)(Tos)_2$, $(i\text{-}C_3H_7)_3Pru(p\text{-cumene})Cl_2$, $(CH_3)_3PRu(p\text{-cumene})Cl_2$, $(n\text{-}C_4H_9)_3PRu(p\text{-cumene})Cl_2$, $[(C_6H_{11})_3P]_2Ru(CH_3\text{—CN})(Tos)_2$, $(C_6H_{11})_3PRu(CH_3\text{—CN})(C_2H_5\text{-OH})(Tos)_2$, $(C_6H_{11})_3PRu(p\text{-cumene})(CH_3\text{—CN})_2(PF_6)_2$, $(C_6H_{11})_3PRu(p\text{-cumene})(CH_3\text{—CN})_2(Tos)_2$, $(n\text{-}C_4H_9)_3PRu(p\text{-cumene})(CH_3\text{-CN})_2(Tos)_2$, $(C_6H_{11})_3PRu(CH_3CN)Cl_2$, $(C_6H_{11})_3PRu(CH_3\text{-CN})Cl_2$, $(C_6H_{11})_3PRu(p\text{-cumene})(C_2H_5OH)(BF_4)_2$, $(C_6H_{11})_3PRu(p\text{-cumene})(C_2H_5OH)_2(BF_4)_2$, $(C_6H_{11})_3PRu(p\text{-cumene})(C_2H_5OH)_2(PF_6)_2$, $(C_6H_{11})_3PRu(C_6H_6)(C_2H_5OH)_2(Tos)_2$, $(C_6H_{11})_3POs(p\text{-cumene})Cl_2$, $(i\text{-}C_3H_7)_3POs(p\text{-cumene})Cl_2$, $(CH_3)_3POs(p\text{-cumene})Cl_2$, $(C_6H_5)_3POs(p\text{-cumene})Cl_2$ and $RuCl_2(p\text{-cumene})[(C_6H_{11})_2PCH_2CH_2P(C_6H_{11})_2]$.

The ruthenium and osmium compounds to be used according to the invention are known or can be prepared by known and analogous processes starting from the metal halides (for example $MeX_3$ or $[Me\text{-arene}X_2]_2$ and reaction with phosphines and ligand-forming agents.

The process according to the invention can be carried out in the presence of an inert solvent. A particular advantage of the process according to the invention is that, in the case of liquid monomers, the process can be carried out without the use of a solvent. Another advantage is that the polymerization itself can be carried out in water, polar and protic solvents or water/solvent mixtures.

Suitable inert solvents are, for example, protic-polar and aprotic solvents, which can be used by themselves or in mixtures of at least two solvents. Examples are: ethers (dibutyl ether, tetrahydrofuran, dioxane, ethylene glycol monomethyl or dimethyl ether, ethylene glycol monoethyl or diethyl ether, diethylene glycol diethyl ether, triethylene glycol dimethyl ether), halogenated hydrocarbons (methylene chloride, chloroform, 1,2-dichloroethane, 1,1,1-trichloroethane, 1,1,2,2-tetrachloroethane), carboxylic acid esters and lactones (ethyl acetate, methyl propionate, ethyl benzoate, 2-methoxyethyl acetate, γ-butyrolactone, δ-valerolactone, pivalolactone), carboxylic acid amides and lactams (N,N-dimethylformamide, N,N-diethylformamide, N,N-dimethylacetamide, tetramethylurea, hexamethylphosphoric acid triamide, γ-butyrolactam, ε-caprolactam, N-methylpyrrolidone, N-acetylpyrrolidone, N-methylcaprolactam), sulfoxides (dimethyl sulfoxide), sulfones (dimethyl sulfone, diethyl sulfone, trimethylene sulfone, tetramethylene sulfone), tertiary amines (N-methylpiperidine, N-methylmorpholine), aliphatic and aromatic hydrocarbons, such as, for example, petroleum ether, pentane, hexane, cyclohexane, methylcyclohexane, benzene or substituted benzenes (chlorobenzene, o-dichlorobenzene, 1,2,4-trichlorobenzene, nitrobenzene, toluene, xylene) and nitriles (acetonitrile, propionitrile, benzonitrile, phenylacetonitrile). Preferred solvents are aprotic polar and nonpolar solvents.

Preferred solvents are aliphatic and aromatic hydrocarbons and mixtures of such solvents.

It is to be particularly emphasized that the compositions of an optionally substituted cycloolefin and catalyst which are employed according to the invention in the process are often insensitive to oxygen, which allows storage and a reaction procedure without an inert gas. Storage with exclusion of light is advisable.

The monomers of the formula I and the catalysts employed for the process according to the invention can be stored both separately and together as a mixture, since the catalyst used has a particularly high stability. Before the photochemical polymerization, the mixture can be stored as a ready-to-use formulation, which is of advantage for use of the process according to the invention on a large industrial scale. Because of the high photosensitivity, in particular in UV light, storage is expediently with exclusion of light.

The invention also relates to a photopolymerizable composition comprising a strained cyclical olefin or at least two different strained cyclical olefins and a catalytically active amount of at least one carbene-free, bivalent-cationic ruthenium or osmium compound which contains at least one phosphine group, at least one photolabile ligand, and optionally neutral ligands bonded to the metal atom, a total of 2 or 3 ligands being bonded, and which contains acid anions for balancing the charge.

The invention also relates to a composition comprising a strained cyclical olefin or at least two different strained cyclical olefins and a catalytically active amount of at least one carbene-free, bivalent-cationic ruthenium or osmium compound which contains at least one phosphine group, at least one photolabile ligand, and optionally neutral ligands bonded to the metal atom, a total of 2 or 3 ligands being bonded, and which contains acid anions for balancing the charge, and acid anions for balancing the charge [sic], with the exception of $P(C_6H_{11})_3$(p-cumene)$RuCl_2$ in combination with norbornene.

The composition according to the invention can additionally comprise other nonvolatile open-chain comonomers which form copolymers with the tight cycloolefins. If dienes, for example, are co-used, crosslinked polymers can form. Some examples of such comonomers are olefinically mono- or di-unsaturated compounds, such as olefins and dienes from the group consisting of pentene, hexene, heptene, octene, decene and dodecylene, acrylic and methacrylic acid, esters and amides thereof, vinyl ether, styrene, butadiene, isoprene and chlorobutadiene.

The other olefins which are capable of metathesis polymerization are contained in the composition according to the invention, for example, in an amount of up to 80% by weight, preferably 0.1 to 80% by weight, more preferably 0.5 to 60% by weight, and particularly preferably 5 to 40% by weight, based on the total amount of compounds of the formula I and other olefins capable of metathesis polymerization.

The composition according to the invention can comprise formulation auxiliaries. Known auxiliaries are antistatics, antioxidants, light stabilizers, plasticizers, dyes, pigments, fillers, reinforcing fillers, lubricants, adhesion promoters, viscosity-increasing agents and mold release auxiliaries. The fillers can be present in surprisingly high contents without adversely influencing the polymerization, for example in amounts of up to 70% by weight, preferably 1 to 70% by weight, more preferably 5 to 60% by weight, particularly preferably 10 to 50% by weight, and especially preferably 10 to 40% by weight, based on the composition. A very large number of fillers and reinforcing fillers for improving the optical, physical, mechanical and electrical properties have been disclosed. Some examples are glass and quartz in the form of powders, beads and fibers, metal and semimetal oxides, carbonates, such as $MgCO_3$, $CaCO_3$ and dolomite, metal sulfates, such as gypsum and baryte, naturally occurring and synthetic silicates, such as talc, zeolites, wollastonite and felspars, aluminas, such as china clay, rock powders, whiskers, carbon fibers, synthetic fibers, powdered plastics and carbon black. Viscosity-increasing agents are, in particular, metathesis polymers which contain olefinically unsaturated groups and can be incorporated into the polymer during the polymerization. Such metathesis polymers are known and are commercially obtainable, for example under the tradename Vestenamere®. Other viscosity-increasing agents are polybutadiene, polyisoprene or polychlorobutadiene, as well as copolymers of butadiene, isoprene and chloroprene with olefins. The viscosity-increasing agents can be contained in an amount of 0.1 to 50, preferably 1 to 30, and particularly preferably 1 to 20% by weight, based on the composition. If fillers are used, it is expedient to obtain optical transparency for the polymerization or to carry out the polymerization in thin layers.

In the process according to the invention, it is not necessary to maintain the irradiation of the reaction mixture over the entire duration of the reaction. Once the polymerization has been initiated photochemically, the further course of the reaction takes place independently, even in the dark. The irradiation is advantageously carried out with light of the nm wavelength in the range from 50 nm to 1000 nm, preferably in the range from 200 to 500 nm, and especially preferably in the UV range. The duration of the irradiation depends on the nature of the light source. UV lasers or UV lamps are preferably employed according to the invention. The irradiation of the catalyst can be carried out both before, during and after the addition of the monomers.

The catalysts used according to the invention are surprisingly highly active, so that the desired polymers are already obtained after short reaction times. Suitable irradiation times are from seconds to hours, in particular seconds to 1 hour. The sequence of the addition of the monomers and catalyst is not critical. The monomer can be both initially introduced into the reaction vessel and added after introduction of the catalyst. Likewise, the catalyst can be irradiated beforehand and the monomer then added. Furthermore, the solution comprising catalyst and monomer can also be irradiated.

The process according to the invention is preferably carried out at room temperature to slightly elevated temperature. An increase in temperature increases the rate of reaction. A photopolymerization chiefly takes place at the temperatures chosen for acceleration of the reaction. However, it should be mentioned that the catalysts can be converted into thermoactive catalysts by adequate irradiation.

The process according to the invention is carried out, in particular, at temperatures from −20° C. to +110° C.

A quite particular and surprising advantage of the process according to the invention is that the ruthenium and osmium compounds used act as thermal catalysts or show a considerably higher activity after the irradiation. This results in the possibility of continuing and ending the polymerization by supplying heat after a short irradiation time, which offers economic and industrial advantages in various areas of production of shaped articles or coatings. In particular, the combined process is favorable for the preparation of thermoplastics.

The invention also relates to a process for the photocatalytically induced and subsequent thermal polymerization of a cyclical olefin or at least two different cyclical olefins in the presence of a metal compound as a catalyst, which is characterized in that a) the cycloolefins are initially irradiated in the presence of a catalytic amount of at least one carbene-free, bivalent-cationic ruthenium or osmium compound which contains at least one phosphine group, at least one photolabile ligand, and optionally neutral ligands bonded to the metal atom, a total of 2 or 3 ligands being bonded, and which contains acid anions for balancing the charge; or a catalytic amount of at least one carbene-free, bivalent-cationic ruthenium or osmium compound which contains at least one phosphine group, at least one photolabile ligand, and optionally neutral ligands bonded to the metal atom, a total of 2 or 3 ligands being bonded, and which contains acid anions for balancing the charge, is irradiated, if appropriate in an inert solvent, and then mixed with at least one cycloolefin; and b) the polymerization is then ended by heating and without irradiation.

The preferences stated above apply to process stage a). The duration of the irradiation essentially depends on the desired reaction procedure. Brief irradiation is chosen, for example, when the polymerization is only to be initiated by irradiation and is to be ended by heating. Brief can mean an irradiation time of up to 60 seconds, preferably 5 to 60 seconds, and particularly preferably 10 to 40 seconds. A longer irradiation time is chosen, for example, when the polymerization is chiefly to be carried out with irradiation and the final polymerization is to be ended only by after-heating.

Heating in process stage b) can mean a reaction temperature of 50° to 200° C., preferably 50° to 150° C., and particularly preferably 70° to 120° C.

Catalytic amounts in the context of the present invention preferably means an amount of 0.001 to 20 mol %, particularly preferably 0.01 to 15 mol %, and especially preferably 0.01 to 10 mol %, based on the amount of the monomer. Because of the high photocatalytic activity, amounts of 0.001 to 2% by weight are especially preferred.

The invention also relates to a process for the preparation of or increasing the activity of thermal catalysts for ring-opening metathesis polymerization of cyclical olefins, which is characterized in that a carbene-free, bivalent-cationic ruthenium or osmium compound which contains at least one phosphine group, at least one photolabile ligand, and optionally neutral ligands bonded to the metal atom, a total of 2 or 3 ligands being bonded, and which contains acid anions for balancing the charge is irradiated in bulk or in a solvent.

Tight olefins, which are known to a large extent, are suitable for the process according to the invention. Cyclohexene can generally not be polymerized by olefin metathesis. This exception is known to the expert and is described, for example, in Ivin [Ivin, K. J. in: Ivin, K. J., Saegusa, T. (editors), Ring-Opening Polymerisation 1:139–144 Elsevier Applied Science Publishers, London and New York (1984)].

Radiation-cured oligomers and polymers having identical or different structural units of the formula XI

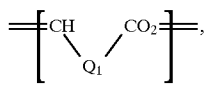 (XI)

in which $Q_1$ and $Q_2$ have the meanings given under formula I, can be prepared by the process according to the invention. The preferences stated above apply to these polymers. They can be homopolymers or copolymers with random distribution of the structural units, graft polymers or block polymers. They can have an average molecular weight ($\overline{Mw}$) of, for example, 500 to 2 million daltons, preferably 1000 to 1 million daltons (determined by GPC by comparison with polystyrene standards of narrow distribution).

Thermoplastically deformable materials for the production of shaped articles of all types, coatings and images in relief can be prepared by the process according to the invention.

The polymers prepared according to the invention can have very different properties, depending on the monomer used. Some of them are distinguished by a very high permeability to oxygen, low dielectric constants, good heat stability and low absorption of water. Others have outstanding optical properties, such as, for example, high transparency and low refractive indices. The low shrinkage is furthermore to be emphasized in particular. They can therefore be used in very different industrial fields.

As layers on the surfaces of carrier materials, the compositions according to the invention are distinguished by a high adhesive strength. The coated materials are furthermore distinguished by a very high surface smoothness and gloss. Of the good mechanical properties, the low shrinkage and the high impact strength, as well as the heat stability, is [sic] to be emphasized in particular. The easy release from the mold and the high resistance to solvents is [sic] furthermore to be mentioned.

The compositions according to the invention can be processed by known shaping processes, for example injection molding, compression molding and casting processes, such as casting in molds (casting resins), injection molding, compression molding and extrusion.

These polymers are suitable for the production of medical equipment, implants or contact lenses; for the production of electronic components; as binders for coatings; as photocurable compositions for model construction or as adhesives for gluing substrates with low surface energies (for example Teflon, polyethylene and polypropylene), as well as a photopolymerizable composition in stereolithography. The compositions according to the invention can also be used for the production of coatings by photopolymerization, it being possible on the one hand for clear (transparent) and even pigmented compositions to be used. Both white and colored pigments can be used. The production of shaped articles by thermoplastic shaping processes for all types of commodity articles may furthermore be mentioned.

The photocurable or photo- and thermocurable compositions according to the invention are particularly suitable for the production of protective coatings and images in relief. The invention also relates to a variant of the process according to the invention for the production of coated materials or images in relief on substrates in which a composition of a cyclical olefin, catalyst and optionally solvent is applied as a layer to a carrier, for example by dipping, brushing, pouring, rolling, knife-coating or whirler pouring processes, the solvent is removed, if appropriate, and the layer is irradiated for polymerization, or the layer is irradiated through a photomask and the nonirradiated portions are then removed with a solvent. Surfaces of substrates can be modified or protected by this process, or, for example, printed circuits, printing plates or printing rolls can be produced. In the production of printed circuits, the compositions according to the invention can also be employed as solder resists. Other possible uses are the production of screen printing masks and use as radiation-curable printing inks for offset, screen and flexographic printing.

The present invention also relates to a carrier material which is coated with an oligomer or polymer according to the invention and comprises a crosslinking agent. The present invention also relates to a carrier material which is coated with an oligomer or polymer according to the invention. These materials are suitable for the production of protective coatings or images in relief by irradiation (if appropriate under a photomask) and subsequent development with a solvent. Suitable crosslinking agents, which can be contained, for example, in an amount of 0.01 to 20% by weight, are, above all, organic bisazides, in particular the commercially available 2,6-bis(4-azidobenzylidene)-4-methyl-cyclohexanone.

The present invention furthermore relates to a coated carrier material, which is characterized in that a layer of (a) a cyclical olefin or at least two different cyclical olefins and (b) a catalytically active amount of at least one carbene-free, bivalent-cationic ruthenium or osmium compound which contains at least one phosphine group, at least one photo-labile ligand, and optionally neutral ligands bonded to the metal atom, a total of 2 or 3 ligands being bonded, and which contains acid anions for balancing the charge is applied to a carrier.

Suitable carrier materials are, for example, those of glass, minerals, ceramics, plastics, wood, semimetals, metals, metal oxides and metal nitrides. The layer thicknesses essentially depend on the desired use and can be, for example, 0.1 to 1000 $\mu$m, preferably 0.5 to 500 $\mu$m, particularly preferably 1 to 100 $\mu$m. The coated materials are distinguished by a high adhesive strength and good thermal and mechanical properties.

The production of the coated materials according to the invention can be carried out by known methods, such as, for example, brushing, knife-coating, pouring processes, such as curtain pouring or whirler pouring.

Particularly good results are often achieved in coatings if cycloolefins which additionally contain one to three, and preferably one, further double bond and are polycyclical fused ring systems in the context of the invention are used for the photometathesis polymerization.

The following examples illustrate the invention further. Abbreviations: Tos=tosylate, RT=room temperature, Trif=trifluoromethylsulfonate.

A) Preparation of ruthenium- and osmiumphosphines

EXAMPLE A1
$(C_6H_{11})_3PRu(C_6H_6)(Tos)_2$ (catalyst A)

140 mg (0.5 mmol) of tricyclohexylphosphine are added to 230 mg of $Ru(C_6H_6)(H_2O)_3(Tos)_2$ (0.4 mmol), dissolved in 30 ml of tetrahydrofuran, and the mixture is stirred at RT for 12 hours and then under reflux for 3 hours. The solvent is stripped off and the residue is washed with diethyl ether (2×10 ml). Yield: 76%. $^1$H-NMR (CDCl$_3$, 300 MHz): coordinated arene ligand: 6.16 (s, 6H); other: 7.70 (d, J=8.0, 4H), 7.14 (d, J=8.0, 4H), 2.36 (s, 6H), 2.18 (m, 3H); 2.0–1.0 (m, 30H).

EXAMPLE A2
$(C_6H_{11})_3PRu(p\text{-cumene})Cl_2$ (catalyst B)

306 mg of $[RuCl_2(p\text{-cumene})]_2$ (0.5 mmol) are dissolved in 75 ml of ethanol, and 280 mg of tricyclohexylphosphine (1 mmol) are added. The mixture is stirred under reflux for 3 hours and the solvent is then stripped off. The residue is washed with 5 ml of hexane. Yield: 90%. $^1$H-NMR (CDCl$_3$, 300 MHz): coordinated arene ligand: 5.56 (m, 4H); 2.84 (sept, J=7.0 Hz, 1H); 2.09 (s, 3H); 1.29 (d, J=7.0 Hz, 6H). Other: 2.41 (m, 3H); 2.20–1.35 (m, 30H).

EXAMPLE A3
$(C_6H_{11})_3PRu(p\text{-cumene})(C_2H_5OH)_m(BF_4)_2$ (catalyst C)

294 mg of $RuCl_2(p\text{-cumene})P(C_6H_{11})_3$ (0.5 mmol) are dissolved in 20 ml of ethanol, and a solution of 253 mg of $AgBF_4$(1 mmol) in 50 ml of ethanol is added dropwise. The solution is stirred at RT for 12 hours, filtered over a frit and concentrated. Yield: 94% [mixture of $(C_6H_{11})_3PRu(p\text{-cumene})(C_2H_5OH)(BF_4)_2$ and $(C_6H_{11})_3PRu(p\text{-cumene})(C_2H_5OH)_2(BF_4)_2$]. $^1$H-NMR (CDCl$_3$, 300 MHz): coordinated arene ligand: 5.62 (d, J=6.0 Hz, 2H); 5.45 (d, J=6.0 Hz, 2H); 2.76 (sept, J=7.0 Hz, 1H); 2.16 (s, 3H); 1.30 (d, J=7.0 Hz, 6H). Other: 2.48 (m, 3H); 2.15–1.30 (m, 30H).

EXAMPLE A4
$(C_6H_{11})_3PRu(p\text{-cumene})(C_2H_5OH)_2(PF_6)_2$ (catalyst D)

Analogously to Example A3, but using 195 mg of $AgPF_6$. Yield 91%. $^1$H-NMR (CDCl$_3$, 300 MHz): coordinated arene ligand: 5.62 (d, J=5.5 Hz, 2H); 5.45 (d, J=5.5 Hz, 2H); 2.76 (sept, J=7.0 Hz, 1H); 2.28 (s, 3H); 1.30 (d, J=7.0 Hz, 6H). Other: 2.50 (m, 3H); 2.15–1.30 (m, 30H).

EXAMPLE A5
$(C_6H_{11})_3PRu(p\text{-cumene})(Tos)_2$ (catalyst E)

Analogously to Example A3, but using 279 mg of Ag-p-toluenesulfonate. Yield 90%. $^1$H-NMR (CDCl$_3$, 300 MHz): coordinated arene ligand: 5.97 (d, J=5.5 Hz, 2H); 5.78 (d, J=5.5 Hz, 2H); 2.95 (sept, J=7.0 Hz, 1H); 2.27 (s, 3H); 1.30 (d, J=7.0 Hz, 6H). Other: 7.53 (d, J=8.0, 4H); 7.05 (d, J=8.0 Hz, 4H); 2.32 (s, 6H), 2.20–1.00 (m, 33H).

EXAMPLE A6
$(C_6H_{11})_3PRu(p\text{-cumene})Br_2$ (catalyst F)

0.24 g of $[RuBr_2(p\text{-cumene})]_2$ (0.3 mmol) is dissolved in 75 ml of ethanol, and 0.17 g of tricyclohexylphosphine (0.6 mmol) is added. The mixture is stirred under reflux for 6 hours and the solvent is then stripped off. The residue is washed with diethyl ether (2×10 ml). Yield 90%. $^1$H-NMR (CDCl$_3$, 300 MHz): coordinated arene ligand: 5.50 (m, 4H); 2.97 (sept, J=7.0 Hz, 1H); 2.10 (s, 3H); 1.19 (d, J=7.0 Hz, 6H). Other: 2.40 (m, 3H); 2.38 (m, 6H); 1.90 –1.30 (m, 24H).

EXAMPLE A7
$(i\text{-}C_3H_7)_3PRu(p\text{-cumene})Cl_2$ (catalyst G)

306 mg of $[RuCl_2(p\text{-cumene})]_2$ (0.5 mmol) are suspended in 40 ml of hexane, 0.5 ml of triisopropylphosphine is added and the mixture is stirred for 12 hours. The precipitate formed is filtered off and washed with hexane (2×30 ml). Yield 90%. $^1$H-NMR (CDCl$_3$, 300 MHz): coordinated arene ligand: 5.58 (m, 4H); 2.80 (sept, J=7.0 Hz, 1H); 2.08 (s, 3H); 1.24 (d, J=7.0 Hz, 6H). Other: 2.72 (m, 1H); 1.35 (dd, 13.0, 7.0 Hz, 18H).

EXAMPLE A8
$RuCl_2(p\text{-cumene})[(C_6H_{11})_2PCH_2CH_2P(C_6H_{11})_2]$(catalyst H)

560 mg of $[RuCl_2(p\text{-cumene})]_2$ (0.915 mmol) are suspended in 50 ml of hexane, 0.93 g (2.2 mmol) of 1,2-bis(dicyclohexylphosphino)ethane is added and the mixture is stirred for 12 hours. The precipitate formed is filtered off and washed with hexane (2×30 ml). Yield 90%. $^1$H-NMR (CDCl$_3$, 300 MHz): coordinated arene ligand: 5.48 (m, 4H); 2.70 (sept, J=7.0 Hz, 1H); 2.04 (s, 3H); 1.13 (d, J=7.0 Hz, 6H). Other: 2.20–1.98 (m, 8H); 1.80–1.10 (m, 36H).

EXAMPLE A9
$(CH_3)_3PRu(p\text{-cumene})Cl_2$ (catalyst I)

520 mg of $[RuCl_2(p\text{-cumene})]_2$ (0.85 mmol) are suspended in 50 ml of hexane, 3.5 ml of a 1.0M solution of trimethylphosphine in toluene (3.5 mmol) are added and the mixture is stirred for 6 hours. The precipitate formed is filtered off and washed with hexane (2×30 ml). Yield 94%. $^1$H-NMR (CDCl$_3$, 300 MHz): coordinated arene ligand: 5.47 (m, 4H); 2.89 (sept, J=7.0 Hz, 1H); 2.11 (s, 3H); 1.26 (d, J=7.0 Hz, 6H). Other: 1.64 (d, $J_{PH}$=11.0 Hz, 9H).

EXAMPLE A10
$(n\text{-}C_4H_9)_3PRu(p\text{-cumene})Cl_2$ (catalyst J)

380 mg of $[RUCl_2(p\text{-cumene})]_2$ (0.62 mmol) are dissolved in 50 ml of ethanol, and 480 mg of tributylphosphine (2.3 mmol) are added. The mixture is stirred under reflux for 4 hours and the solvent is then stripped off. The residue is washed with 20 ml of hexane. Yield 97%. $^1$H-NMR (CDCl$_3$, 300 MHz): coordinated arene ligand: 5.38 (m, 4H); 2.81 (sept, J=7.0 Hz, 1H); 2.10 (s, 3H); 1.22 (d, J=7.0 Hz, 6H). Other: 1.95 (m, 6H); 1.40 (m, 12H); 0.90 (t, 9H).

EXAMPLE A11

(C$_6$H$_{11}$)$_2$HPRu(p-cumene)Cl$_2$ (catalyst K)

500 mg of [RuCl$_2$(p-cumene)]$_2$(0.82 mmol) are suspended in 50 ml of hexane, 0.65 g of dicyclohexylphosphine (3.3 mmol) is added and the mixture is stirred under reflux for 6 hours. The precipitate formed is filtered off and washed with hexane (2×25 ml). Yield 89%. $^1$H-NMR (CDCl$_3$, 300 MHz): coordinated arene ligand: 5.42 (m, 4H); 2.76 (sept, J=7.0 Hz, 1H); 2.03 (s, 3H); 1.15 (d, J=7.0 Hz, 6H). Other: 4.89, 3.66 (d, J$_{PH}$=370 Hz, 1H 2.23 (m, 2H); 1.90–1.10 (m, 20H).

EXAMPLE A12

(C$_6$H$_{11}$)$_3$POs(p-cumene)Cl$_2$ (catalyst L)

168 mg of tricyclohexylphosphine (0.6 mmol) are added to 158 mg of [OsCl$_2$(p-cumene)]$_2$ (0.2 mmol) in 50 ml of hexane and the mixture is stirred under reflux for 5 hours. After cooling to RT, the precipitate is filtered off and washed with hexane (2×5 ml). Yield 96%. $^1$H-NMR (C$_6$D$_6$, 300 MHz): coordinated arene ligand: 5.51 (d, J=5.5 Hz, 2H); 5.33 (d, J=5.5 Hz, 2H); 2.79 (sept, J=7.0 Hz, 1H); 1.96 (s, 3H); 1.21 (d, J=7.0 Hz, 6H). Other: 2.56 (m, 3H); 2.21 (m, 6H); 1.73–1.60 (m, 9H); 1.48–1.36 (m, 6H); 1.30–1.23 (m, 9H).

EXAMPLE A13

(i-C$_3$H$_7$)$_3$POs(p-cumene)Cl$_2$ (catalyst M)

115 µl of triisopropylphosphine (0.6 mmol) are added to 158 mg of [OsCl$_2$(p-cumene)]$_2$ (0.2 mmol) in 50 ml of octane and the mixture is heated under reflux for 5 hours. After cooling to RT, the precipitate is filtered off and washed with hexane (2×10 ml) Yield 83%. $^1$H-NMR (CDCl$_3$, 300 MHz): coordinated arene ligand: 5.79 (d, J=5.5 Hz, 2H); 5.70 (d, J=5.5 Hz, 2H); 2.69 (sept, J=7.0 Hz, 1H); 2.13 (s, 3H); 1.26 (d, J=7.0 Hz, 6H). Other: 2.74 (m, 3H); 1.24 (dd, J=13.0, 7.0 Hz, 18H).

EXAMPLE A14

(CH$_3$)$_3$POs(p-cumene)Cl$_2$ (catalyst N)

Analogously to Example A13, but using an equivalent amount of P(CH$_3$)$_3$ instead of P(C$_6$H$_{11}$)$_3$. Yield 76%. $^1$H-NMR (CDCl$_3$, 300 MHz): coordinated arene ligand: 5.49 (d, J=5.5 Hz, 2H); 5.44 (d, J=5.5 Hz, 2H); 2.69 (sept, J=7.0 Hz, 1H); 2.12 (s, 3H); 1.26 (d, J=7.0 Hz, 6H). Other: 1.53 (d, J$_{PH}$=10.5 Hz, 9H).

EXAMPLE A15

(C$_6$H$_5$)$_3$POs(p-cumene)Cl$_2$ (catalyst O)

157 mg of triphenylphosphine (0.6 mmol) are added to 158 mg of [OSCl$_2$(p-cumene)]$_2$ (0.2 mmol) in 50 ml of hexane and the mixture is stirred under reflux for 5 hours. After cooling to RT, the precipitate formed is filtered off and washed with diethyl ether (2×10 ml). Yield 92%. $^1$H-NMR (CDCl$_3$, 300 MHz): coordinated arene ligand: 5.39 (d, J=5.5 Hz, 2H); 5.16 (d, J=5.5 Hz, 2H); 2.75 (sept, J=7.0 Hz, 1H); 1.97 (s, 3H); 1.15 (d, J=7.0 Hz, 6H). Other: 7.79–7.70 (m, 6H); 7.40–7.30 (m, 9H).

EXAMPLE A16

(C$_6$H$_{11}$)$_3$PRu(p-cumene)(acetonitrile)(Trif)$_2$ (catalyst P)

1 g of (C$_6$H$_{11}$)$_3$PRu(p-cumene)Cl$_2$ are dissolved in 20 ml of acetonitrile. 920 mg of AgTrif (2.1 equivalents) are added to this solution. After stirring for 15 minutes, the solvents are removed in vacuo. Extraction with 30 ml of CH$_2$Cl$_2$ and subsequent evaporation gives the product.

$^1$H-NMR (CDCl$_3$): δ 6.48–6.98 (dd, 4H, p-cumene); 2.65 (s+sept, 4H, CH$_3$CN+(i-C$_3$H$_7$)-H; 2.10 (s, 3H CH$_3$-p-cumene); 1.29 (d, 6H, i-C$_3$H$_7$-p-cumene) 2.25–1–10 (m, P(C$_6$H$_{11}$)$_3$).

B) Preparation of Polymers

EXAMPLES B1–B16

The sources of light used are:
(a) 200 W mercury vapor medium-pressure UV lamp (Osram HBO 200 W/2, manufacturer Spindler & Hoyer, Göttingen).
(b) self-built UV irradiation apparatus with 4×40 W R-UVA lamps TL 40W/10 OR and 2×20 W TL 20W/05 from Philips. Distance about 25 cm.

500 mg of norbornene and 3 mg of catalyst are dissolved in 3 ml of CHCl$_3$ and irradiated under the conditions stated in Table 1.

TABLE 1

| Example No. | Catalyst* | Conversion** in % | Time, Temperature |
|---|---|---|---|
| B1 | A | 100 | 10 min RT |
| B2 | B | 94 | 30 sec RT |
| B3 | C | 60 | 2 min RT |
| B4 | D | 70 | 3 min RT |
| B5 | E | 34 | 20 min RT |
| B6 | F | 50 | 4 min RT |
| B7 | G | 100 | 2 min RT |
| B8 | H | 52 | 2 min RT |
| B9 | I | 80 | 5 min RT |
| B10 | J | 70 | 3 min RT |
| B11 | K | 67 | 3 min RT |
| B12 | L | 71 | 2 min RT |
| B13 | M | 100 | 5 min RT |
| B14 | N | 100 | 10 min RT |
| B15 | O | 15 | 1 h RT |
| B16 | P | 71 | 2 min RT |

*Catalysts prepared as in Examples A1 to A16
**Conversion after recrystallization from ethanol

EXAMPLE B17

(a) 500 mg of norbornene and 5 mg of catalyst P in 5 ml of ethanol are stirred without light for 3 hours. No polymer can be precipitated out.
(b) 500 mg of norbornene and 5 mg of catalyst P in 5ml of ethanol are exposed to a 200 W mercury vapor medium-pressure UV lamp (Osram HBO 200 W/2, manufacturer Spindler & Hoyer, Göttingen) for 30 minutes. Yield: 100% of polynorbornene.

EXAMPLE B18

(a) 500 mg of norbornene are added to 5 mg of catalyst J in 5 ml of toluene and the mixture is stirred without light for 3 hours. The solution remains liquid.
(b) 5 mg of catalyst J in 5 ml of toluene are exposed to a 200 W mercury vapor medium-pressure UV lamp (Osram HBO 200 W/2, manufacturer Spindler & Hoyer, Göttingen) for 5 minutes. 500 mg of norbornene are then added. The solution gels within 10 minutes. Yield after 3 hours, 100% of polynorbornene.

EXAMPLES B19 TO B21

500 mg of monomer compound (23) and 3 mg of catalyst are dissolved in 3 ml of CHCl$_3$ and the solution is irradiated under the conditions stated in Table 2. A 200 W mercury vapor medium-pressure UV lamp (Osram HBO 200 W/2, manufacturer Spindler & Hoyer, Göttingen) is used as the source of light.

TABLE 2

| Example | Catalyst* | Conversion** | Time, Temperature |
|---------|-----------|--------------|-------------------|
| B19 | B | 100 | 30 min RT |
| B20 | J | 85 | 30 min RT |

*Conversion in % after recrystallization from ethanol [sic]

We claim:

1. A process for the photocatalytic polymerization of a cyclical olefin or at least two different cyclical olefins in the presence of a metal compound as catalyst, characterized in that a photochemical ring-opening metathesis polymerization takes place in the presence of a catalytic amount of at least one carbene-free, bivalent-cationic ruthenium or osmium compound which contains at least one phosphine group and at least one additional photolabile ligand defined as nitrogen ($N_2$) ligand, monocyclical, polycyclical or fused arenes which have 6 to 24 C atoms and are unsubstituted or substituted by OH, $C_1$–$C_4$alkyl, $C_1$–$C_4$alkoxy, $C_6$–$C_{12}$aryl or halogen, or monocyclical heteroarenes, fused heteroarenes or fused arene-heteroarenes which have 3 to 22 C atoms and 1 to 3 heteroatoms selected from the group consisting of O, S and N and are unsubstituted or substituted by $C_1$–$C_4$alkyl, $C_1$–$C_4$alkoxy or halogen; or aliphatic, cycloaliphatic, aromatic or araliphatic nitriles which have 1 to 22 C atoms and are unsubstituted or substituted by $C_1$–$C_4$alkyl, $C_1$–$C_4$alkoxy or halogen, and wherein the ruthenium or osmium compound optionally contains non-photolabile ligands bonded to the metal atom, a total of 2 to 5 ligands being bonded, and which contains acid ions for balancing the charge.

2. Process according to claim 1, characterized in that the cyclical olefins are monocyclical rings or polycyclical, bridged or fused ring systems with 2 to 4 rings, which are unsubstituted or substituted and optionally contain one or more heteroatoms from the group consisting of O, S, N and Si in one or more rings and optionally contain fused aromatic or heteroaromatic rings.

3. Process according to claim 2, characterized in that the cyclical rings contain 3 to 16 ring members.

4. Process according to claim 3, characterized in that the cyclical rings contain 3 to 12 ring members.

5. Process according to claim 2, characterized in that the cyclical olefins contain further nonaromatic double bonds.

6. Process according to claim 1, characterized in that the cycloolefins correspond to the formula I

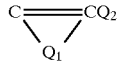  (I)

in which $Q_1$ is a radical having at least one carbon atom which, together with the —CH=$CQ_2$ group, forms an at least 3-membered alicyclical ring which optionally contains one or more heteroatoms chosen from the group consisting of silicon, phosphorus, oxygen, nitrogen and sulfur; and which is unsubstituted or substituted by halogen, =O, —CN, —$NO_2$, $R_1R_2R_3Si$—(O)$_u$—, —COOM, —$SO_3M$, —$PO_3M$, —COO($M_1$)$_{1/2}$, —$SO_3$($M_1$)$_{1/2}$, —$PO_3(M_1)_{1/2}$, $C_1$–$C_{20}$alkyl, $C_1$–$C_{20}$hydroxyalkyl, $C_1$–$C_{20}$haloalkyl, $C_1$–$C_6$cyanoalkyl, $C_3$–$C_8$cycloalkyl, $C_6$–$C_{16}$aryl, $C_7$–$C_{16}$aralkyl, $C_3$–$C_6$heterocycloalkyl, $C_3$–$C_{16}$heteroaryl, $C_4$–$C_{16}$heteroaralkyl or $R_4$—X—; or in which two adjacent C atoms are substituted by —CO—O—CO— or —CO—$NR_5$—CO—; or in which an alicyclical, aromatic or heteroaromatic ring which is unsubstituted or substituted by halogen, —CN, —$NO_2$, $R_6R_7R_8Si$—(O)$_u$—, —COOM, —$SO_3M$, —$PO_3M$, —COO($M_1$)$_{1/2}$, —$SO_3(M_1)_{1/2}$, —$PO_3(M_1)_{1/2}$, $C_1$–$C_{20}$alkyl, $C_1$–$C_{20}$haloalkyl, $C_1$–$C_{20}$hydroxyalkyl, $C_1$–$C_6$cyanoalkyl, $C_3$–$C_8$cycloalkyl, $C_6$–$C_{16}$aryl, $C_7$–$C_{16}$aralkyl, $C_3$–$C_6$heterocycloalkyl, $C_3$–$C_{16}$heteroaryl, $C_4$–$C_{16}$heteroaralkyl or $R_{13}$—$X_1$— is optionally fused onto adjacent carbon atoms of the alicyclical ring;

X and $X_1$ independently of one another are —O—, —S—, —CO—, —SO—, —$SO_2$—, —O—C(O)—, —C(O)—O—, —C(O)—$NR_5$—, —$NR_{10}$—C(O)—, —$SO_2$—O— or —O—$SO_2$—;

$R_1$, $R_2$ and $R_3$ independently of one another are $C_1$–$C_{12}$alkyl, $C_1$–$C_{12}$perfluoroalkyl, phenyl or benzyl;

$R_4$ and $R_{13}$ independently are $C_1$–$C_{20}$alkyl, $C_1$–$C_{20}$haloalkyl, $C_1$–$C_{20}$hydroxyalkyl, $C_3$–$C_8$cycloalkyl, $C_6$–$C_{16}$aryl or $C_7$–$C_{16}$aralkyl;

$R_5$ and $R_{10}$ independently of one another are hydrogen, $C_1$–$C_{12}$alkyl, phenyl or benzyl, where the alkyl groups in turn are unsubstituted or substituted by $C_1$–$C_{12}$alkoxy or $C_3$–$C_8$cycloalkyl;

$R_6$, $R_7$ and $R_8$ independently of one another are $C_1$–$C_{12}$alkyl, $C_1$–$C_{12}$perfluoroalkyl, phenyl or benzyl;

M is an alkali metal and $M_1$ is an alkaline earth metal; and u is 0 or 1;

where the alicyclical ring formed with $Q_1$ optionally contains further nonaromatic double bonds;

$Q_2$ is hydrogen, $C_1$–$C_{20}$alkyl, $C_1$–$C_{20}$haloalkyl, $C_1$–$C_{12}$alkoxy, halogen, —CN or $R_{11}$—$X_2$—;

$R_{11}$ is $C_1$–$C_{20}$alkyl, $C_1$–$C_{20}$haloalkyl, $C_1$–$C_{20}$hydroxyalkyl, $C_3$–$C_8$cycloalkyl, $C_6$–$C_{16}$aryl or $C_7$–$C_{16}$aralkyl;

$X_2$ is —C(O)—O— or —C(O)—$NR_{12}$—;

$R_{12}$ is hydrogen, $C_1$–$C_{12}$alkyl, phenyl or benzyl;

where the abovementioned cycloalkyl, heterocycloalkyl, aryl, heteroaryl, aralkyl and heteroaralkyl groups are unsubstituted or substituted by $C_1$–$C_{12}$alkyl, $C_1$–$C_{12}$alkoxy, —$NO_2$, —CN or halogen, and where the heteroatoms of the abovementioned heterocycloalkyl, heteroaryl and heteroaralkyl groups are chosen from the group consisting of —O—, —S—, —$NR_9$— and —N=; and $R_9$ is hydrogen, $C_1$–$C_{12}$alkyl, phenyl or benzyl.

7. Process according to claim 6, characterized in that the alicyclical ring which $Q_1$ forms together with the —CH=$CQ_2$— group has 3 to 16 ring atoms, where the ring system is monocyclical, bicyclical, tricyclical or tetracyclical.

8. Process according to claim 6, characterized in that $Q_2$ in formula I is hydrogen.

9. Process according to claim 6, characterized in that in the compounds of the formula I $Q_1$ is a radical with at least one carbon atom which, together with the —CH=$CQ_2$— group, forms a 3- to 20-membered alicyclical ring which optionally contains one or more heteroatoms chosen from the group consisting of silicon, oxygen, nitrogen and sulfur; and which is unsubstituted or substituted by halogen, =O, —CN, —$NO_2$, $R_1R_2R_3Si$—(O)$_u$—, —COOM, —SO₃M, —PO₃M, —COO(M₁)₁/₂, —SO₃(M₁)₁/₂, —PO₃(M₁)₁/₂, C₁-C₁₂alkyl, C₁-C₁₂haloalkyl, C₁-C₁₂hydroxyalkyl, C₁-C₄cyanoalkyl, C₃-C₆cycloalkyl, C₆-C₁₂aryl, C₇-C₁₂aralkyl, C₃-C₆heterocycloalkyl, C₃-C₁₂heteroaryl, C₄-C₁₂heteroaralkyl or R₄—X—; or in which two adjacent C atoms in this radical Q₁ are substituted by —CO—O—CO— or —CO—NR₅—CO—; or in which an alicyclical, aromatic or heteroaromatic ring which is unsubstituted or substituted by halogen, —CN, —NO₂, R₆R₇R₈Si—, —COOM, —SO₃M, —PO₃M, —COO(M₁)₁/₂, —SO₃(M₁)₁/₂, —PO₃(M₁)₁/₂, C₁-C₁₂alkyl, C₁-C₁₂haloalkyl, C₁-C₁₂hydroxyalkyl, C₁-C₄cyanoalkyl, C₃-C₆cycloalkyl, C₆-C₁₂aryl, C₇-C₁₂aralkyl, C₃-C₆heterocycloalkyl, C₃-C₁₂heteroaryl, C₄-C₁₂heteroaralkyl or R₁₃—X₁— is optionally fused onto adjacent carbon atoms;

X and X₁ independently of one another are —O—, —S—, —CO—, —SO—, —SO₂—, —O—C(O)—, —C(O)—O—, —C(O)—NR₅—, —NR₁₀—C(O)—, —SO₂—O— or —O—SO₂—;

R₁, R₂ and R₃ independently of one another are C₁-C₆alkyl, C₁-C₆perfluoroalkyl, phenyl or benzyl;

M is an alkali metal and M₁ is an alkaline earth metal;

R₄ and R₁₃ independently of one another are C₁-C₁₂alkyl, C₁-C₁₂haloalkyl, C₁-C₁₂hydroxyalkyl, C₃-C₈cycloalkyl, C₆-C₁₂aryl or C₇-C₁₂aralkyl;

R₅ and R₁₀ independently of one another are hydrogen, C₁-C₆alkyl, phenyl or benzyl, where the alkyl groups in turn are unsubstituted or substituted by C₁-C₆alkoxy or C₃-C₆cycloalkyl;

R₆, R₇ and R₈ independently of one another are C₁-C₆alkyl, C₁-C₆perfluoroalkyl, phenyl or benzyl;

u is 0 or 1;

where the alicyclical ring formed with Q₁ optionally contains further nonaromatic double bonds;

Q₂ is hydrogen, C₁-C₁₂alkyl, C₁-C₁₂haloalkyl, C₁-C₆alkoxy, halogen, —CN or R₁₁—X₂—;

R₁₁ is C₁-C₁₂alkyl, C₁-C₁₂haloalkyl, C₁-C₁₂hydroxyalkyl, C₃-C₆cycloalkyl, C₆-C₁₂aryl or C₇-C₁₂aralkyl;

X₂ is —C(O)—O— or —C(O)—NR₁₂—; and

R₁₂ is hydrogen, C₁-C₆alkyl, phenyl or benzyl;

where the cycloalkyl, heterocycloalkyl, aryl, heteroaryl, aralkyl and heteroaralkyl groups are unsubstituted or substituted by C₁-C₆alkyl, C₁-C₆alkoxy, —NO₂, —CN or halogen, and where the heteroatoms of the heterocycloalkyl, heteroaryl and heteroaralkyl groups are chosen from the group consisting of —O—, —S—, —NR₉— and —N═; and R₉ is hydrogen, C₁-C₆alkyl, phenyl or benzyl.

10. Process according to claim 6, characterized in that in the compounds of the formula I Q₁ is a radical with at least one carbon atom which, together with the —CH═CQ₂— group, forms a 3- to 10-membered alicyclical ring which optionally contains a heteroatom chosen from the group consisting of silicon, oxygen, nitrogen and sulfur and is unsubstituted or substituted by halogen, —CN, —NO₂, R₁R₂R₃Si—, —COOM, —SO₃M, —PO₃M, —COO(M₁)₁/₂, —SO₃(M₁)₁/₂, —PO₃(M₁)₁/₂, C₁-C₆alkyl, C₁-C₆haloalkyl, C₁-C₆hydroxyalkyl, C₁-C₄cyanoalkyl, C₃-C₆cycloalkyl, phenyl, benzyl or R₄—X—; or in which an alicyclical, aromatic or heteroaromatic ring which is unsubstituted or substituted by halogen, —CN, —NO₂, R₆R₇R₈Si—, —COOM, —SO₃M, —PO₃M, —COO(M₁)₁/₂, —SO₃(M₁)₁/₂, —PO₃(M₁)₁/₂, C₁-C₆alkyl, C₁-C₆haloalkyl, C₁-C₆hydroxyalkyl, C₁-C₄cyanoalkyl, C₃-C₆cycloalkyl, phenyl, benzyl or R₁₃—X₁— is optionally fused onto adjacent carbon atoms;

R₁, R₂ and R₃ independently of one another are C₁-C₄alkyl, C₁-C₄perfluoroalkyl, phenyl or benzyl;

M is an alkali metal and M₁ is an alkaline earth metal;

R₄ and R₁₃ independently of one another are C₁-C₆alkyl, C₁-C₆haloalkyl, C₁-C₆hydroxyalkyl or C₃-C₆cycloalkyl;

X and X₁ independently of one another are —O—, —S—, —CO—, —SO— or —SO₂—;

R₆, R₇ and R₇ independently of one another are C₁-C₄alkyl, C₁-C₄perfluoroalkyl, phenyl or benzyl; and Q₂ is hydrogen.

11. Process according to claim 1, characterized in that the cyclical olefins are norbornene or norbornene derivatives.

12. Process according to claim 11, characterized in that the norbornene derivatives are those of the formula II

in which

X₃ is —CHR₁₆—, oxygen or sulfur;

R₁₄ and R₁₅ independently of one another are hydrogen, —CN, trifluoromethyl, (CH₃)₃Si—O—, (CH₃)₃Si— or —COOR₁₇; and R₁₆ and R₁₇ independently of one another are hydrogen, C₁-C₁₂-alkyl, phenyl or benzyl;

or those of the formula III

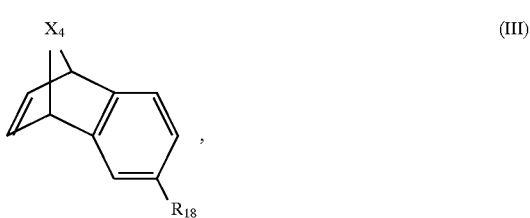

in which

X₄ is —CHR₁₉—, oxygen or sulfur;

R₁₉ is hydrogen, C₁-C₁₂alkyl, phenyl or benzyl; and

R₁₈ is hydrogen, C₁-C₆alkyl or halogen;

or those of the formula IV

in which

X₅ is —CHR₂₂—, oxygen or sulfur;

R₂₂ is hydrogen, C₁-C₁₂alkyl, phenyl or benzyl;

R₂₀ and R₂₁ independently of one another are hydrogen, CN, trifluoromethyl, (CH₃)₃Si—O—, (CH₃)₃Si— or —COOR₂₃; and R₂₃ is hydrogen, C₁-C₁₂alkyl, phenyl or benzyl;

or those of the formula V $$\text{(V)}$$

in which $X_6$ is —CHR$_{24}$—, oxygen or sulfur;

$R_{24}$ is hydrogen, $C_1$–$C_{12}$alkyl, phenyl or benzyl;

Y is oxygen or

>N—R$_{25}$; and $R_{25}$ is hydrogen, methyl, ethyl or phenyl.

13. Process according to claim 1, characterized in that the phosphine ligands correspond to the formulae VII or VIIa, $$PR_{26}R_{27}R_{28} \quad \text{(VII)},$$

$$R_{26}R_{27}P\text{-}Z_1\text{-}PR_{26}R_{27} \quad \text{(VIIa)},$$

in which $R_{26}$, $R_{27}$ and $R_{28}$ independently of one another are H, $C_1$–$C_{20}$alkyl, $C_4$–$C_{12}$cycloalkyl which is unsubstituted or substituted by $C_1$–$C_6$alkyl, $C_1$–$C_6$haloalkyl or $C_1$–$C_6$alkoxy; or $C_6$–$C_{16}$aryl which is unsubstituted or substituted by $C_1$–$C_6$alkyl, $C_1$–$C_6$haloalkyl or $C_1$–$C_6$alkoxy; or $C_7$–$C_{16}$aralkyl which is unsubstituted or substituted by $C_1$–$C_6$alkyl, $C_1$–$C_6$haloalkyl or $C_1$–$C_6$alkoxy; the radicals $R_{26}$ and $R_{27}$ together are tetra- or pentamethylene which is unsubstituted or substituted by $C_1$–$C_6$alkyl, $C_1$–$C_6$haloalkyl or $C_1$–$C_6$alkoxy, or tetra- or pentamethylene which is unsubstituted or substituted by $C_1$–$C_6$alkyl, $C_1$–$C_6$haloalkyl or $C_1$–$C_6$alkoxy and fused with 1 or 2 1,2-phenylene, and $R_{28}$ has the abovementioned meaning; and $Z_1$ is linear or branched $C_2$–$C_{12}$alkylene which is unsubstituted or substituted by $C_1$–$C_4$alkoxy, 1,2- or 1,3-cycloalkylene which has 4 to 8 C atoms and is unsubstituted or substituted by $C_1$–$C_4$alkyl or $C_1$–$C_4$alkoxy, or 1,2 or 1,3-heterocycloalkylene which has 5 or 6 ring members and one heteroatom from the group consisting of O or N and is unsubstituted or substituted by $C_1$–$C_4$alkyl or $C_1$–$C_4$alkoxy.

14. Process according to claim 13, characterized in that the radicals $R_{26}$, $R_{27}$ and $R_{28}$ are identical radicals.

15. Process according to claim 13, characterized in that the phosphine ligands correspond to the formula VII, in which $R_{26}$, $R_{27}$ and $R_{28}$ independently of one another are H, $C_1$–$C_6$alkyl, cyclopentyl or cyclohexyl which are unsubstituted or substituted by $C_1$–$C_4$alkyl, or phenyl which is unsubstituted or substituted by $C_1$–$C_4$alkyl, $C_1$–$C_4$alkyl [sic], $C_1$–$C_4$alkoxy or trifluoromethyl, or benzyl which is unsubstituted or substituted by $C_1$–$C_4$alkyl, $C_1$–$C_4$alkoxy or trifluoromethyl.

16. Process according to claim 13, characterized in that the phosphine ligands of the formula VII are $(C_6H_5)_3P$, $(C_6H_5CH_2)_3P$, $(C_5H_{11})_3P$, $(CH_3)_3P$, $(C_2H_5)_3P$, $(n\text{-}C_3H_7)_3P$, $(i\text{-}C_3H_7)_3P$, $(n\text{-}C_4H_9)_3P$, $(C_6H_5)_2HP$, $(C_6H_5CH_2)_2HP$, $(C_6H_{11})_3P$, $(C_5H_{11})_2HP$, $(C_6H_{11})_2HP$, $(C_6H_{11})_2HP$, $(CH_3)_2HP$, $(C_2H_5)_2HP$, $(n\text{-}C_3H_7)_2HP$, $(i\text{-}C_3H_7)_2HP$, $(n\text{-}C_4H_9)_2HP$, $(C_6H_5)H_2P$, $(C_6H_5CH_2)H_2P$, $(C_5H_{11})H_2P$, $(C_6H_{11})H_2P$, $(CH_3)H_2P$, $(C_2H_5)H_2P$, $(n\text{-}C_3H_7)H_2P$, $(i\text{-}C_3H_7)H_2P$, $(n\text{-}C_4H_9)H_2P$, $PH_3$, $(2\text{-methyl-}C_6H_4)_3P$, $(3\text{-}CH_3\text{-}C_6H_4)_3P$, $(4\text{-}CH_3\text{-}C_6H_4)_3P$, $(2,4\text{-di-}CH_3\text{-}C_6H_3)_3P$, $(2,6\text{-di-}CH_3\text{-}c_6H_3)_3P$, $(2\text{-}C_2H_5\text{-}C_6H_4)_3P$, $(3\text{-}C_2H_5\text{-}C_6H_4)_3P$, $(4\text{-}C_2H_5\text{-}C_6H_4)_3P$, $(2\text{-n-}C_3H_7\text{-}C_6H_4)_3P$, $(3\text{-n-}C_3H_7\text{-}C_6H_4)_3P$, $(4\text{-n-}C_3H_7\text{-}C_6H_4)_3P$, $(2\text{-i-}C_3H_7\text{-}C_6H_4)_3P$, $(3\text{-i-}C_3H_7\text{-}C_6H_4)_3P$, $(2\text{-n-}C_4H_9\text{-}C_6H_4)_3P$, $(3\text{-n-}C_4H_9\text{-}C_6H_4)_3P$, $(4\text{-n-}C_4H_9\text{-}C_6H_4)_3P$, $(2\text{-i-}C_4H_9\text{-}C_6H_4)_3P$, $(3\text{-i-}C_4H_9\text{-}C_6H_4)_3P$, $(4\text{-i-}C_4H_9\text{-}C_6H_4)_3P$, $(2\text{-t-}C_4H_9\text{-}C_6H_4)_3P$, $(3\text{-t-}C_4H_9\text{-}C_6H_4)_3P$, $(4\text{-t-}C_4H_9\text{-}C_6H_4)_3P$, $(2\text{-}CH_3\text{-}6\text{-t-}C_4H_9\text{-}C_6H_3)_3P$, $(3\text{-}CH_3\text{-}6\text{-t-}C_4H_9\text{-}C_6H_3)_3P$, $(3\text{-}CH_3\text{-}6\text{-t-}C_4H_9\text{-}C_6H_3)_3P$, $(2,6\text{-di-t-}C_4H_9\text{-}C_6H_3)_3P$, $(2,3\text{-di-t-}C_4H_9\text{-}C_6H_3)_3P$, or $(2,4\text{-di-t-}C_4H_9\text{-}C_6H_3)_3P$ handelt.

17. Process according to claim 1, characterized in that the photolabile ligands are benzene which is unsubstituted or substituted by 1 to 3 $C_1$–$C_4$alkyl.

18. Process according to claim 1, characterized in that the photolabile ligands are nitriles having 1 to 12 C atoms.

19. Process according to claim 1, characterized in that the photolabile ligands are benzene which is unsubstituted or substituted by one to three $C_1$–$C_4$alkyl, or thiophene, benzonitrile or acetonitrile.

20. Process according to claim 19, characterized in that the arenes and heteroarenes are benzene, p-cumene, biphenyl, naphthalene, anthracene, acenaphthene, fluorene, phenanthrene, pyrene, chrysene, fluoranthrene, furan, thiophene, pyrrole, pyridine, γ-pyran, γ-thiopyran, pyrimidine, pyrazine, indole, coumarone, thionaphthene, carbazole, dibenzofuran, dibenzothiophene, pyrazole, imidazole, benzimidazole, oxazole, thiazole, isoxazole, isothiazole, quinoline, isoquinoline, acridine, chromene, phenazine, phenoxazine, phenothiazine, triazines, thianthrene or purine.

21. Process according to claim 1, characterized in that the neutral ligands are $H_2O$, $H_2S$, $NH_3$; optionally halogenated aliphatic or cycloaliphatic alcohols or mercaptans having 1 to 18 C atoms, aromatic alcohols or thiols having 6 to 18 C atoms, araliphatic alcohols or thiols having 7 to 18 C atoms; open-chain or cyclical and aliphatic, araliphatic or aromatic ethers, thioethers, sulfoxides, sulfones, ketones, aldehydes, carboxylic acid esters, lactones, optionally N—$C_1$–$C_4$mono- or -dialkylated carboxylic acid amides having 2 to 20 C atoms, and optionally N—$C_1$–$C_4$alkylated lactams; open-chain or cyclical and aliphatic, araliphatic or aromatic primary, secondary and tertiary amines having 1 to 20 C atoms; or cyclopentadienyls.

22. Process according to claim 21, characterized in that the neutral ligands are $H_2O$, $NH_3$ or $C_1$–$C_4$alkanols which are unsubstituted or partly or completely fluorinated, or cyclopentadienyl.

23. Process according to claim 1, characterized in that the anions of inorganic or organic acids are chosen from the group consisting of hydride, halide, the anion of an oxygen acid, cyclopentadienyl and $BF_4^-$, $PF_6^-$, $SbF_6^-$ or $AsF_6^-$.

24. Process according to claim 1, characterized in that the anions of oxygen acids are sulfate, phosphate, perchlorate, perbromate, periodate, antimonate, arsenate, nitrate, carbonate, the anion of a $C_1$–$C_8$carboxylic acid, sulfonates, phenylsulfonate or benzylsulfonate which are optionally substituted by $C_1$–$C_4$alkyl, $C_1$–$C_4$alkoxy or halogen or phosphonates.

25. Process according to claim 24, characterized in that the acid anions are $H^\ominus$, $C^\ominus$, $Br^\ominus$, $BF_4^\ominus$, $PF_6^\ominus$, $SbF_6^{63}$, $AsF_6^\ominus$, $CF_3SO_3^\ominus$, $C_6H_5$—$SO_3^\ominus$, 4-methyl-$C_6H_5$—$SO_3^\ominus$, 2,6-dimethyl-$C_6H_5$—$SO_3^{63}$, 2,4,6-trimethyl-$C_6H_5$—$SO_3^\ominus$ and 4-$CF_3$—$C_6H_5$—$SO_3^\ominus$ or cyclopentadienyl ($CP^\ominus$).

26. Process according to claim 1, characterized in that the ruthenium and osmium compounds correspond to the formulae VIII, VIIIa, VIIIb, VIIIc, VIIId, VIIIe or VIIIf $$R_{32}L_1Me^{2+}(Z^{n-})_{2/n} \quad \text{(VIII)},$$

$$R_{32}L_2L_3Me^{2+}(Z^{n-})_{2/n} \qquad (VIIIa),$$

$$(R_{32})_2L_2Me^{2+}(Z^{n-})_{2/n} \qquad (VIIIb),$$

$$(R_{32})_3L_2Me^{2+}(Z^{n-})_{2/n} \qquad (VIIIc),$$

$$R_{32}L_1L_2Me^{2+}(Z^{n-})_{2/n} \qquad (VIIId),$$

$$R_{32}L_2L_2Me^{2+}(Z^{n-})_{2/n} \qquad (VIIIe),$$

$$R_{32}L_1L_3Me^{2+}(Z^{n-})_{2/n} \qquad (VIIIf),$$

in which $R_{32}$ is a tertiary phosphine of the formula VII or VIIa according to claim 15;

Me is Ru or Os;

n is the numbers 1, 2 or 3;

Z is the anion of an inorganic or organic acid;

(a) $L_1$ is an arene or heteroarene ligand;

(b) $L_2$ is a monovalent photolabile ligand which differs from $L_1$; and (c) $L_3$ is a monovalent nonphotolabile ligand.

27. Process according to claim 1, characterized in that the ruthenium and osmium compounds correspond to the formulae IX, IXa, IXb, IXc, IXd, IXe or IXf $$(R_{26}R_{27}R_{28}P)L_1Me^{2+}(Z^{1-})_2 \qquad (IX),$$

$$(R_{26}R_{27}R_{28}P)_2L_2Me^{2+}(Z^{1-})_2 \qquad (IXa),$$

$$(R_{26}R_{27}R_{28}P)L_2L_3Me^{2+}(Z^{1-})_2 \qquad (IXb),$$

$$(R_{26}R_{27}R_{28}P)_3L_2Me^{2+}(Z^{1-})_2 \qquad (IXc),$$

$$(R_{26}R_{27}R_{28}P)L_2L_2Me^{2+}(Z^{1-})_2 \qquad (IXd),$$

$$(R_{26}R_{27}R_{28}P)L_1L_3Me^{2+}(Z^{1-})_2 \qquad (IXe),$$

$$(R_{26}R_{27}R_{28}P)L_1(L_2)_mMe^{2+}(Z^{1-})_2 \qquad (IXf),$$

in which

Me is Ru or Os;

Z in formulae IX to IXe is $H^\ominus$, cyclopentadienyl, $Cl^\ominus$, $Br^\ominus$, $BF_4^\ominus$, $PF_6^\ominus$, $SbF_6^\ominus$, $AsF_6^\ominus$, $CF_3SO_3^\ominus$, $C_6H_5$—$SO_3^\ominus$, 4-methyl-$C_6H_5$—$SO_3^\ominus$, 2,6-dimethyl-$C_6H_5$—$SO_3^\ominus$, 2,4,6-trimethyl-$C_6H_5$—$SO_3^\ominus$ or 4-$CF_3$-$C_6H_5$—$SO_3^\ominus$, and in formula IXf is $H^\ominus$, cyclopentadienyl, $BF_4^\ominus$, $PF_6^\ominus$, $SbF_6^\ominus$, $AsF_6^\ominus$, $CF_3SO_3^\ominus$, $C_6H_5$—$SO_3^\ominus$, 4-methyl-$C_6H_5$—$SO_3^\ominus$, 2,6-dimethyl-$C_6H_5$—$SO_3^\ominus$, 2,4,6-trimethyl-$C_6H_5$—$SO_3^\ominus$, or 4-$CF_3$-$C_6H_5$—$SO_3^\ominus$;

m is 1 or 2;

$R_{26}$, $R_{27}$ and $R_{28}$ independently of one another are $C_1$–$C_6$alkyl or -alkoxy, cyclopentyl or cyclohexyl or cyclopentyloxy or cyclohexyloxy which are unsubstituted or substituted by 1 to 3 $C_1$–$C_4$alkyl, or phenyl or benzyl or phenyloxy or benzyloxy which are unsubstituted or substituted by 1 to 3 $C_1$–$C_4$alkyl;

$L_1$ is $C_6$–$C_{16}$arene or $C_5$–$C_{16}$heteroarene which are unsubstituted or substituted by 1 to 3 $C_1$–$C_4$alkyl, $C_1$–$C_4$alkoxy, —OH, —F or Cl;

$L_2$ is $C_1$–$C_6$alkyl-CN, benzonitrile or benzylnitrile; and $L_3$ is $H_2O$ or $C_1$–$C_6$alkanol.

28. Process according to claim 1, characterized in that the ruthenium and osmium compounds are $(C_6H_{11})_2HPRu(p\text{-cumene})Cl_2$, $(C_6H_{11})_3PRu(p\text{-cumene})Cl_2$, $(C_6H_{11})_3PRu(p\text{-cumene})(Tos)_2$, $(C_6H_{11})_3PRu(p\text{-cumene})Br_2$, $(C_6H_{11})_3PRu(p\text{-cumene})ClF$, $(C_6H_{11})_3PRu(C_6H_6)(Tos)_2$, $(C_6H_{11})_3PRu(CH_3\text{-}C_6H_5)(Tos)_2$, $(C_6H_{11})_3PRu(i\text{-}C_3H_7\text{-}C_6H_5)(Tos)_2$, $(C_6H_{11})_3PRu(chrysene)(Tos)_2$, $(C_6H_{11})_3PRu(biphenyl)(Tos)_2$, $(C_6H_{11})_3PRu(anthracene)(Tos)_2$, $(C_6H_{11})_3PRu(C_{10}H_8)(Tos)_2$, $(i\text{-}C_3H_7)_3Pru(p\text{-cumene})Cl_2$, $(CH_3)_3PRu(p\text{-cumene})Cl_2$, $(n\text{-}C_4H_9)_3Pru(p\text{-cumene})Cl_2$, $[(C_6H_{11})_3P]_2Ru(CH_3\text{-}CN)(Tos)_2$, $(C_6H_{11})_3PRu(CH_3\text{-}CN)(C_2H_5\text{-}OH)(Tos)_2$, $(C_6H_{11})_3PRu(p\text{-cumene})(CH_3\text{-}CN)_2(PF_6)_2$, $(C_6H_{11})_3PRu(p\text{-cumene})(CH_3\text{-}CN)_2(Tos)_2$, $(n\text{-}C_4H_9)_3Pru(p\text{-cumene})(CH_3\text{-}CN)_2(Tos)_2$, $(C_6H_{11})_3PRu(CH_3CN)Cl_2$, $(C_6H_{11})_3PRu(CH_3\text{-}CN)_2Cl_2$, $(C_6H_{11})_3PRu(p\text{-cumene})(C_2H_5OH)(BF_4)_2$, $(C_6H_{11})_3PRu(p\text{-cumene})(C_2H_5OH)_2(BF_4)_2$, $(C_6H_{11})_3PRu(p\text{-cumene})(C_2H_5OH)_2(PF_6)_2$, $(C_6H_{11})_3PRu(C_6H_6)(C_2H_5OH)_2(Tos)_2$, $(C_6H_{11})_3POs(p\text{-cumene})Cl_2$, $i\text{-}C_3H_7)_3POs(p\text{-cumene})Cl_2$, $(CH_3)_3POs(p\text{-cumene})Cl_2$, $(C_6H_5)_3POs(p\text{-cumene})Cl_2$ or $RuCl_2(p\text{-cumene})[(C_6H_{11})_2PCH_2CH_2P(C_6H_{11})_2]$, where Tos is tosylate.

29. Process for the photocatalytically induced and subsequent thermal polymerization of a strained cyclical olefin or at least two different strained cyclical olefins in the presence of a metal compound as a catalyst according to claim 1, characterized in that a) the cycloolefins are initially irradiated in the presence of a catalytic amount of at least one carbene-free, bivalent-cationic ruthenium or osmium compound which contains a phosphine group, at least one photolabile ligand, and optionally neutral ligands bonded to the metal atom, a total of 2 or 3 ligands being bonded, and which contains acid anions for balancing the charge; or a catalytic amount of at least one carbene-free, bivalent-cationic ruthenium or osmium compound which contains at least one phosphine group, at least one photolabile ligand, and optionally neutral ligands bonded to the metal atom, a total of 2 or 3 ligands being bonded, and which contains acid anions for balancing the charge, is irradiated, if appropriate in an inert solvent, and then mixed with at least one strained cycloolefin; and b) the polymerization is then completed by heating and without irradiation.

30. Photopolymerizable composition comprising (a) a strained cyclical olefin or at least two different strained cyclical olefins and (b) a catalytically active amount of at least one carbene-free, bivalent-cationic ruthenium or osmium compound which contains at least one phosphine group, at least one photolabile ligand, and optionally neutral ligands bonded to the metal atom, a total of 2 or 3 ligands being bonded, and which contains acid anions for balancing the charge.

31. Composition comprising a strained cyclical olefin or at least two different strained cyclical olefins and a catalytically active amount of at least one carbene-free, bivalent-cationic ruthenium or osmium compound which contains at least one phosphine group, at least one photolabile ligand, and optionally neutral ligands bonded to the metal atom, a total of 2 or 3 ligands being bonded, and which contains acid anions for balancing the charge, with the exception of $P(C_6H_{11})_3(p\text{-cumene})RuCl_2$ in combination with norbornene.

32. Coated carrier material, characterized in that a layer of (a) a cyclical olefin or at least two different cyclical olefins and (b) a catalytically active amount of at least one carbene-free, bivalent-cationic ruthenium or osmium compound which contains at least one phosphine group, at least one photolabile ligand, and optionally neutral ligands bonded to the metal atom, a total of 2 or 3 ligands being bonded, and which contains acid anions for balancing the charge is applied to a carrier.

33. Carrier material which is coated with an oligomer or polymer prepared according to claim 1 and which comprises a crosslinking agent.

34. Coated carrier material, characterized in that a layer of a polymer prepared according to claim 1 is applied to a carrier.

35. Process for the production of coated materials or images in relief on carriers, in which a composition according to claim 31 is applied, the solvent is removed and the layer is irradiated for polymerization.

* * * * *